(12) United States Patent
Fujiwara

(10) Patent No.: US 10,800,630 B2
(45) Date of Patent: Oct. 13, 2020

(54) IMAGE READING APPARATUS

(71) Applicant: BROTHER KOGYO KABUSHIKI KAISHA, Aichi-ken (JP)

(72) Inventor: Takashi Fujiwara, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 44 days.

(21) Appl. No.: 16/287,901

(22) Filed: Feb. 27, 2019

(65) Prior Publication Data

US 2019/0263616 A1 Aug. 29, 2019

(30) Foreign Application Priority Data

Feb. 28, 2018 (JP) ................. 2018-034729

(51) Int. Cl.
| | |
|---|---|
| *B65H 29/50* | (2006.01) |
| *B65H 5/36* | (2006.01) |
| *B65H 31/10* | (2006.01) |
| *B65H 1/08* | (2006.01) |
| *B65H 1/14* | (2006.01) |

(Continued)

(52) U.S. Cl.
CPC ............. *B65H 29/50* (2013.01); *B65H 1/08* (2013.01); *B65H 1/14* (2013.01); *B65H 1/18* (2013.01); *B65H 3/0669* (2013.01); *B65H 3/0684* (2013.01); *B65H 5/36* (2013.01); *B65H 7/04* (2013.01); *B65H 31/10* (2013.01); *B65H 2403/53* (2013.01); *B65H 2801/06* (2013.01); *B65H 2801/39* (2013.01)

(58) Field of Classification Search
CPC .......... B65H 29/50; B65H 1/18; B65H 29/22; B65H 2511/152; B65H 2553/612; B65H 43/06; B65H 1/14; B65H 3/0684; B65H 3/0669; B65H 7/04; B65H 7/02; B65H 2405/3321; B65H 2801/39; B65H 2403/53
USPC .......................................... 271/201; 399/367
See application file for complete search history.

(56) References Cited

U.S. PATENT DOCUMENTS

| 7,364,155 B2 * | 4/2008 | Nagao ...................... B65H 1/08 271/186 |
|---|---|---|
| 7,564,600 B2 * | 7/2009 | Shoji .................. H04N 1/00631 358/498 |

(Continued)

FOREIGN PATENT DOCUMENTS

| JP | 57111683 A | * | 7/1982 | ............. B65H 29/50 |
|---|---|---|---|---|
| JP | 10-167545 A | | 6/1998 | |
| JP | 2005-8283 A | | 1/2005 | |

*Primary Examiner* — Jeremy R Severson
(74) *Attorney, Agent, or Firm* — Kenealy Vaidya LLP

(57) ABSTRACT

A discharge unit includes a first discharge guide which guides the sheet conveyed by the conveyance guide, a second discharge guide which includes the discharge opening, and guides the sheet guided by the first discharge guide toward the discharge tray, and a discharge roller and a discharge pinch roller which are provided in the second discharge guide. The first discharge guide is rotatable around a first axis which is parallel with an axial direction of the discharge roller. The second discharge guide is connected to the first discharge guide to be rotatable around a second axis which is parallel with the first axis. An angle at which the second discharge guide is inclined with respect to a sheet supporting surface in the discharge tray is constant while the discharge unit is moving from the third position up to the fourth position.

9 Claims, 11 Drawing Sheets

(51) Int. Cl.
  *B65H 3/06* (2006.01)
  *B65H 7/04* (2006.01)
  *B65H 1/18* (2006.01)

(56) References Cited

U.S. PATENT DOCUMENTS

| | | | | |
|---|---|---|---|---|
| 7,828,288 B2 * | 11/2010 | Kim | ............... | B65H 29/50 |
| | | | | 271/200 |
| 9,670,026 B2 * | 6/2017 | Watanabe | ............... | B65H 5/062 |
| 10,584,007 B2 * | 3/2020 | Matsumura | ............... | B65H 7/14 |

* cited by examiner

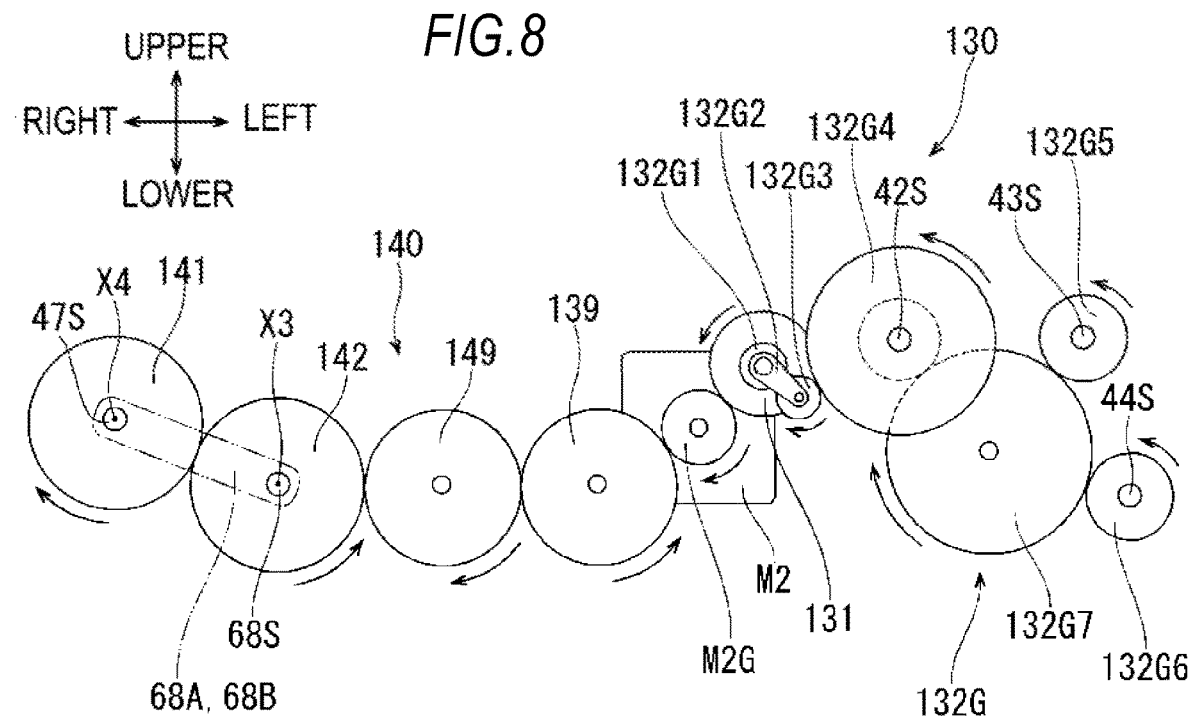
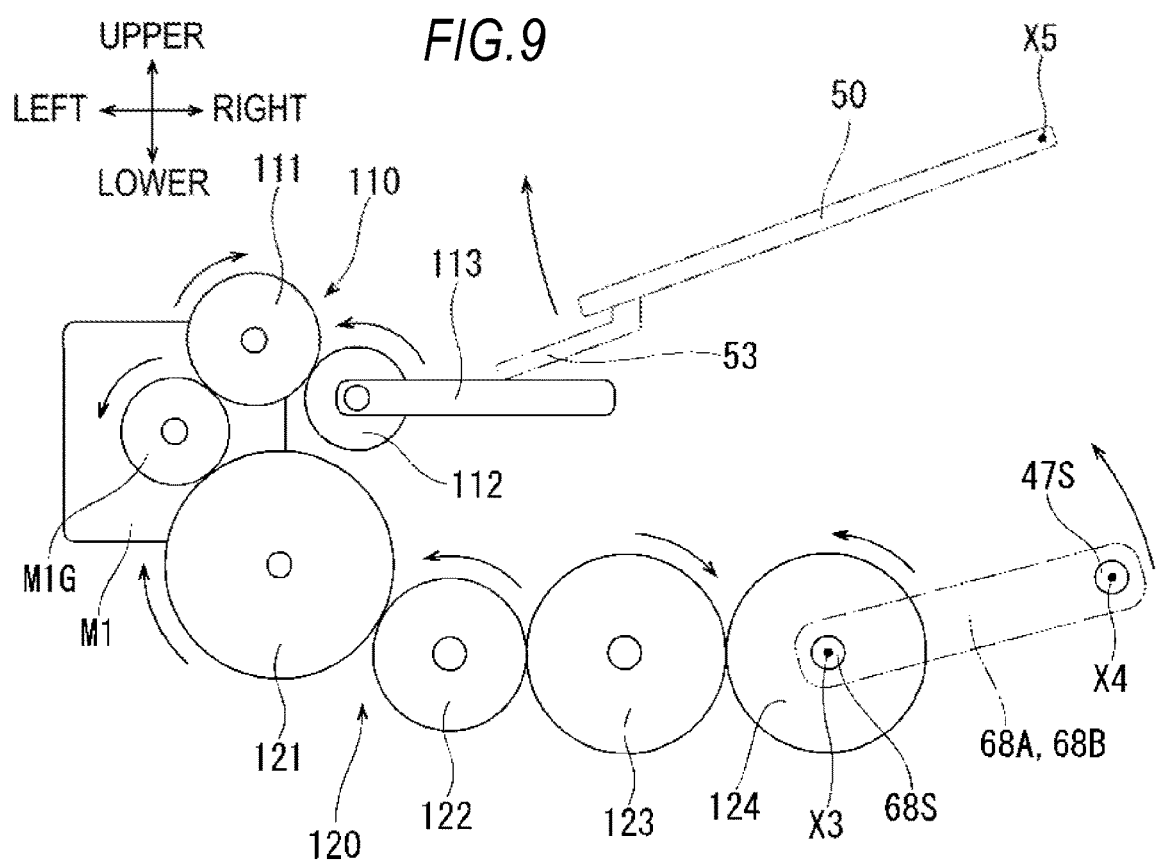

IMAGE READING APPARATUS

CROSS-REFERENCE TO RELATED APPLICATION

This application claims priority from Japanese Patent Application No. 2018-034729 filed on Feb. 28, 2018, the entire subject matter of which is incorporated herein by reference.

TECHNICAL FIELD

This disclosure relates to an image reading apparatus.

BACKGROUND

The background art discloses a document feeding device being an example of image reading apparatuses according to the background art. The document feeding device is provided with a paper feed tray, a paper discharge tray and a conveyance guide. The paper feed tray supports a supplied document. The paper discharge tray is positioned below the paper feed tray and supports the document to be discharged. The conveyance guide conveys the document from the paper feed tray to the paper discharge tray. In the middle of the conveyance guide, an image reading position for reading an image on the document to be conveyed on the conveyance guide is set.

The paper feed tray moves upward as sheets supported by the paper feed tray is decreased and approaches a document pickup unit. The document feeding device further includes a swing conveyance unit. The swing conveyance unit includes a discharge opening to discharge the document conveyed by the conveyance guide to the paper discharge tray. The swing conveyance unit moves upward as the document supported by the paper feed tray is decreased, thereby separating the discharge opening from the paper discharge tray. Specifically, a link member is installed between the paper feed tray and the swing conveyance unit, and the discharge opening of the swing conveyance unit ascends and descend according to the ascent and descent of the paper feed tray.

The swing conveyance unit includes a discharge guide, a discharge roller, and a discharge pinch roller. The discharge guide is rotatable around a rotation axis parallel with an axial direction of the discharge roller. An angle at which the discharge guide is inclined with respect to a sheet supporting surface in the discharge tray is increased or decreased by rotation of the discharge guide.

SUMMARY

Meanwhile, an image reading device including the same configuration as that of the document feeding device described above is assumed. The image reading device is provided with a supply tray including a movable body and a discharge unit. The discharge unit includes a discharge opening for discharging a sheet to a discharge tray. The discharge opening of the discharge unit ascends and descends according to the ascent and descent of the supply tray. The discharge unit includes a discharge guide, a discharge roller, and a discharge pinch roller. An angle at which the discharge guide is inclined with respect to a sheet supporting surface in the discharge tray is increased or decreased by rotation of the discharge guide.

However, in the image reading device, since a direction in which the sheet is discharged from the discharge opening is significantly changed by the rotation of the discharge guide, a posture change of the sheet discharged to the discharge tray tends to be large. Therefore, for example, the front end of the sheet which is being discharged from the discharge opening hangs down by the own weight thereof, so that an angle of abutting on the sheet supported by the sheet supporting surface in the discharge tray becomes easily excessive. As a result, a drawback that the sheet supported by the sheet supporting surface is pushed out by the sheet which is in the process of being discharged from the discharge opening may easily occur. That is, in the image reading device, there is a problem that it is difficult to stably stack a plurality of sheets discharged to the discharge tray on the sheet supporting surface.

In consideration of the above-mentioned circumstances of the related art, an object of this disclosure is to provide an image reading device capable of stably stacking a plurality of sheets discharged to the discharge tray on the sheet supporting surface.

According to this disclosure, an image reading device includes: a supply tray, which supports sheets to be supplied and includes a movable plate configured to move from a first position to a second position as the sheets supported by the supply tray is decreased, the second position being higher than the first position; a discharge tray, which is positioned below the supply tray and supports the sheet to be discharged; a conveyance guide, which conveys the sheet from the supply tray to the discharge tray; a reading sensor, which reads an image on the sheet to be conveyed on the conveyance guide; and a discharge unit, which includes a discharge opening to discharge the sheet conveyed by the conveyance guide to the discharge tray and is configured to move from a third position to a fourth position as the document supported by the paper feed tray is decreased, the fourth position being higher than the third position. The discharge unit includes: a first discharge guide, which guides the sheet conveyed by the conveyance guide; a second discharge guide, which includes the discharge opening and guides the sheet guided by the first discharge guide toward the discharge tray; a discharge roller, which is provided in the second discharge guide and discharges the sheet from the discharge opening; and a discharge pinch roller, which is provided in the second discharge guide and is pressed against the discharge roller. The first discharge guide is rotatable around a first axis which is parallel with an axial direction of the discharge roller, the second discharge guide is connected to the first discharge guide to be rotatable around a second axis which is parallel with the first axis; and an angle, at which the second discharge guide is inclined with respect to a sheet supporting surface in the discharge tray, is constant while the discharge unit is moving from the third position up to the fourth position.

In the image reading device of this disclosure, the discharge unit includes the first discharge guide and the second discharge guide that are bendably connected to each other, and the angle at which the second discharge guide is inclined with respect to the sheet supporting surface in the discharge tray is constant regardless of the movement of the discharge unit. As a result, a posture change of the sheet discharged to the discharge tray can be prevented. For example, when the front end of the sheet which is being discharged from the discharge opening hangs down by the own weight, it is possible to prevent an angle of abutting on the sheet supported by the sheet supporting surface in the discharge tray from becoming excessive. As a result, it is possible to prevent a drawback that the sheet supported by the sheet supporting surface is pushed out by the sheet which is being discharged from the discharge opening.

Therefore, in the image reading device of this disclosure, it is possible to stably stack the plurality of sheets discharged to the discharge tray on the sheet supporting surface.

BRIEF DESCRIPTION OF THE DRAWINGS

The foregoing and additional features and characteristics of this disclosure will become more apparent from the following detailed descriptions considered with the reference to the accompanying drawings, wherein:

FIG. 8 is a schematic diagram illustrating a second drive source, a conveyance drive train and the like, as viewed from an arrow Z direction in FIG. 7;

FIG. 9 is a schematic diagram illustrating a movable plate, a link arm, a first drive source, a first drive train, a third drive train, and the like when viewed from an arrow Y direction in FIG. 7, and is a diagram illustrating a state in which the movable plate is at a first position, and the link arm is at a position corresponding to a third position of a discharge unit;

DETAILED DESCRIPTION

Hereinafter, first and third embodiments in which this disclosure is embodied will be described with reference to the drawings.

First Embodiment

Figure 1:
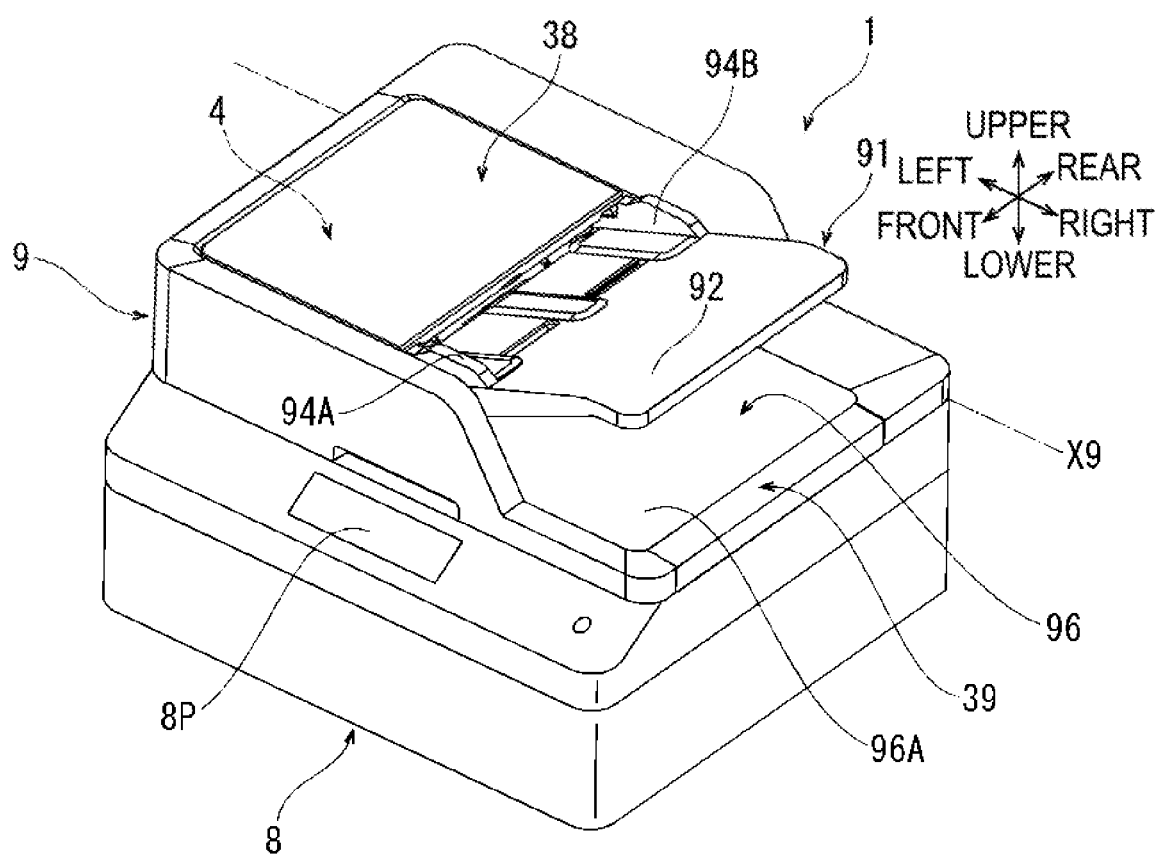
FIG. 1 is a perspective view illustrating an image reading apparatus according to a first embodiment.
Figure 2:
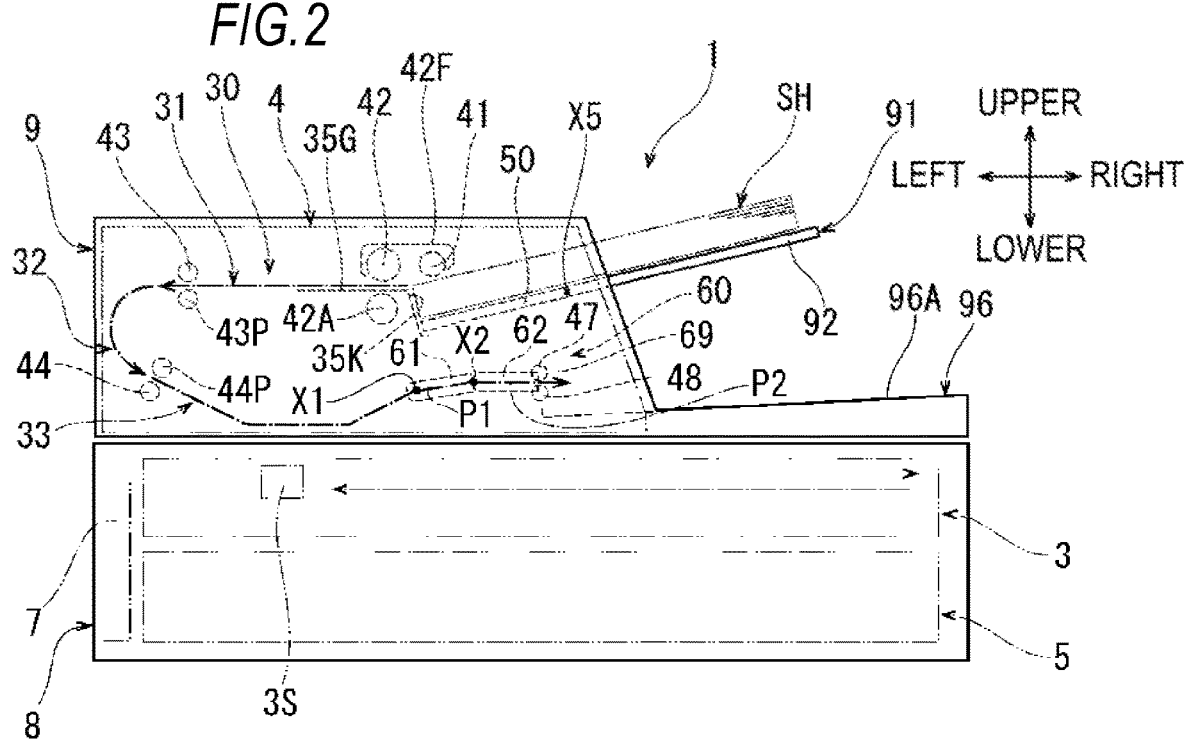
FIG. 2 is a schematic front view illustrating the image reading apparatus according to the first embodiment.

As illustrated in FIG. 1, an image reading apparatus 1 of a first embodiment is an example of a specific aspect of the image reading apparatus of this disclosure. In FIG. 1, a side on which an operation panel 8P is disposed is defined as a front side of a device, and a side which comes to the left when facing the operation panel 8P is defined as a left side, thereby displaying respective directions of front, rear, left, right, upper and lower sides. Then, each direction illustrated in each drawing from FIG. 2 is displayed corresponding to each direction illustrated in FIG. 1. Hereinafter, respective components provided in the image reading apparatus 1 will be described based on FIG. 1 and the like.

<Overall Configuration>

As illustrated in FIGS. 1 to 4, the image reading apparatus 1 includes a main body unit 8, an opening and closing unit 9, an image forming unit 5, a reading unit 3, an automatic conveyance mechanism 4 and a controller 7. The main body unit 8 is an approximately flat box-shaped body. As illustrated in FIG. 1, the operation panel 8P which is a touch panel and the like is provided on a front surface of the main body unit 8.

Figure 5:
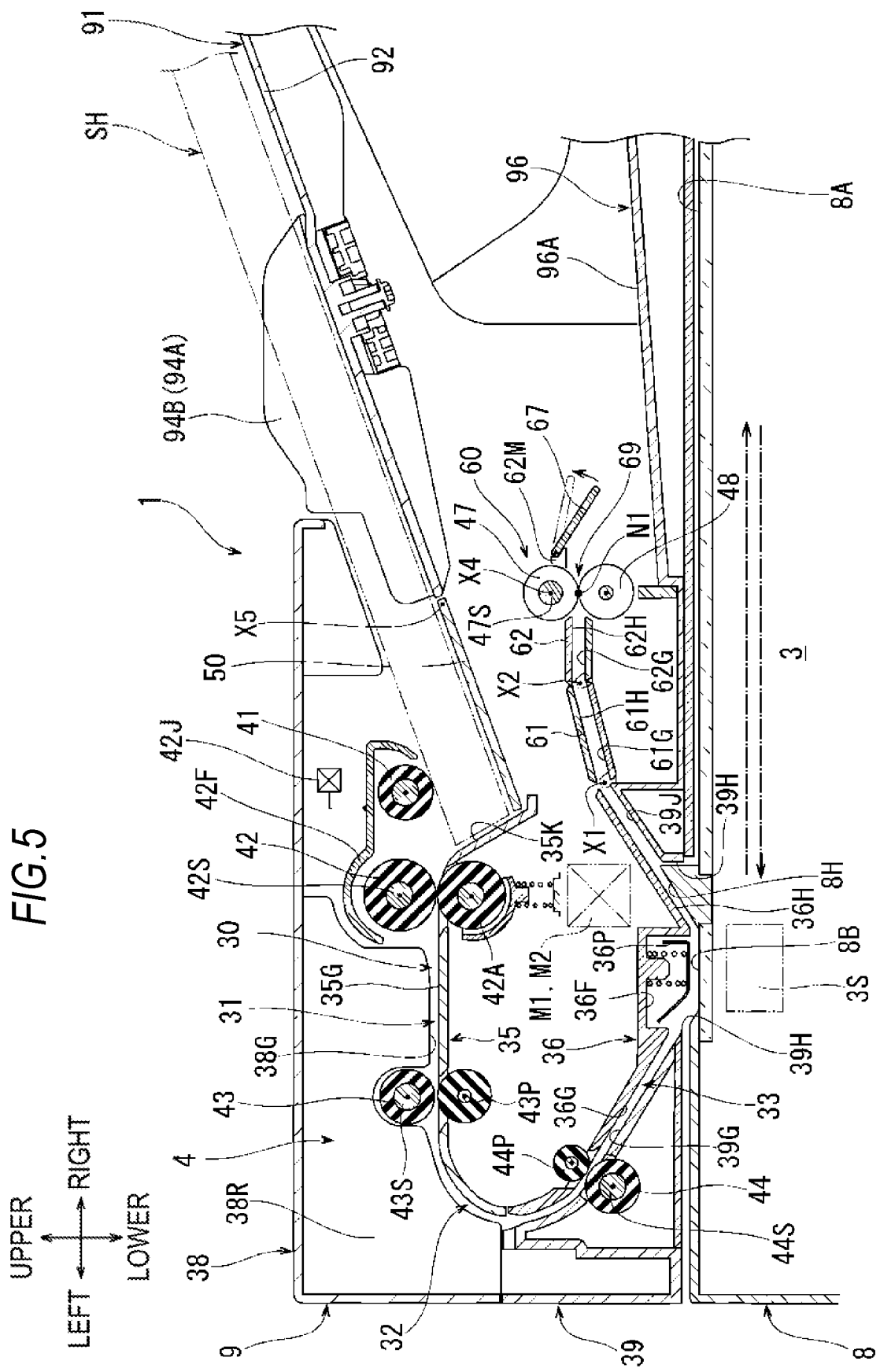
FIG. 5 is a partial cross-sectional view illustrating the image reading apparatus according to the first embodiment.

As illustrated in FIG. 2, the image forming unit 5 is stored at a lower portion in the main body unit 8. The image forming unit 5 forms an image on a sheet by an ink jet method, a laser method, or the like. As illustrated in FIGS. 2 and 5, the reading unit 3 is positioned at an upper portion in the main body unit 8. The reading unit 3 is used when reading an image on a document. The automatic conveyance mechanism 4 is provided in the opening and closing unit 9. The automatic conveyance mechanism 4 is used when allowing the reading unit 3 to read an image on a sheet SH while sequentially conveying the sheet SH supported by a supply tray 91 along a conveyance guide 30.

Figure 4:
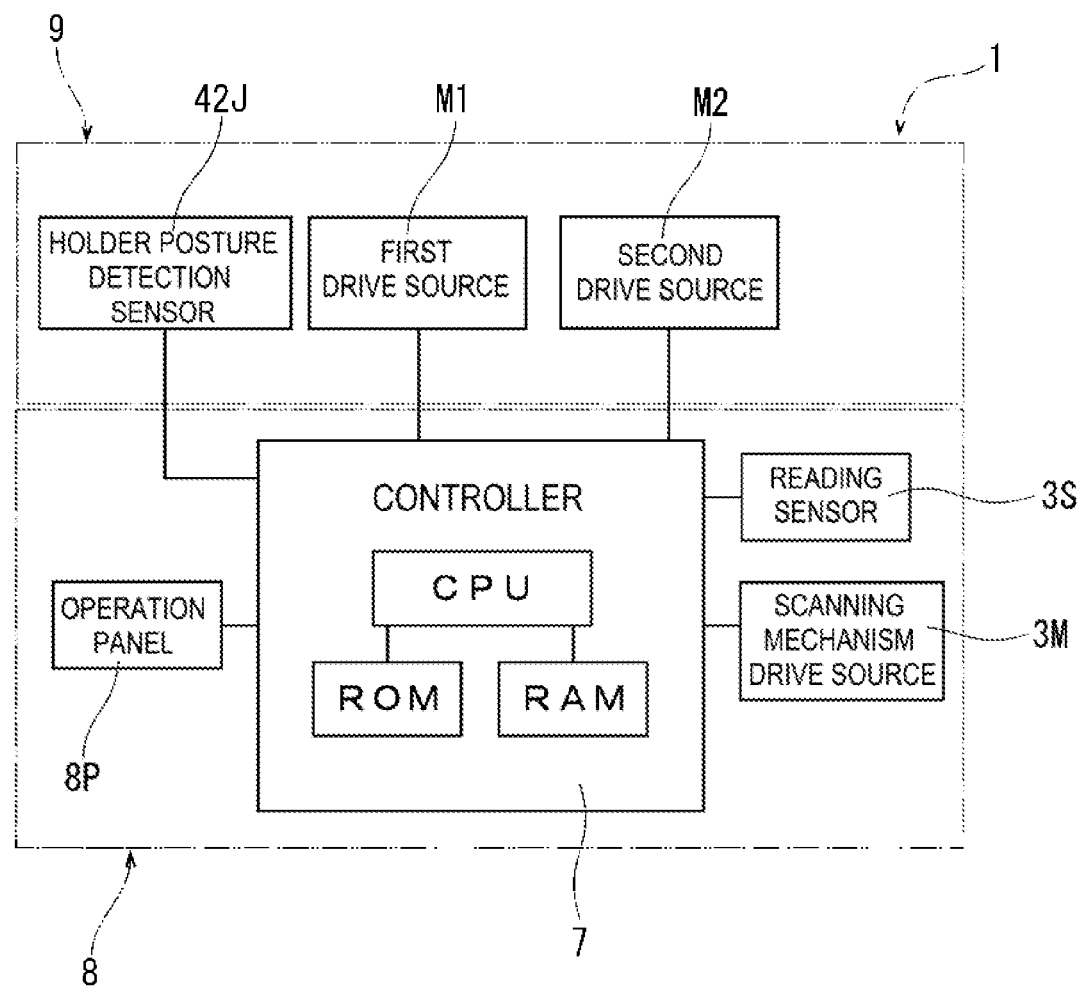
FIG. 4 is a block diagram illustrating the image reading apparatus according to the first embodiment.

As illustrated in FIGS. 2 and 4, the controller 7 is stored at a position along a left side surface in the main body unit 8. The controller 7 is formed as a microcomputer mainly including a CPU, a ROM and a RAM. The ROM stores a program for the CPU to control various operations of the image reading apparatus 1, a program for performing identification processing and the like. The RAM is used as a storage region for temporarily recording data and signals used when the CPU executes the programs, or as a work region for data processing. The controller 7 controls the image forming unit 5, the reading unit 3, the automatic conveyance mechanism 4 and the operation panel 8P.

As illustrated in FIG. 5, platen glass is disposed on an upper surface of the main body unit 8 and a document supporting surface 8A with a large area is formed by an upper surface of the platen glass. Further, another platen glass is disposed on a left side further than the document supporting surface 8A on the upper surface of the main body unit 8, and an elongated reading surface 8B is formed in a front and rear direction by an upper surface of the another platen glass.

The document supporting surface 8A supports the document from below when the reading unit 3 reads an image on the document in a stationary state. The document which is an object to be read includes a sheet such as a paper, or an OHP sheet as well as a book and the like.

The reading surface 8B contacts the conveyed sheet SH from below when the reading unit 3 reads the image on the sheet SH conveyed one by one by the automatic conveyance mechanism 4. A guide protruding portion 8H is provided between the document supporting surface 8A and the reading surface 8B on the upper surface of the main body unit 8. The guide protruding portion 8H scoops up the sheet SH to be conveyed while contacting the reading surface 8B and guides the sheet SH so as to be inclined upward to the right.

Further, in the embodiment, an object whose image is read by using the document supporting surface 8A is described as a document, and an object whose image is read while being conveyed by the automatic conveyance mechanism 4 is described as a sheet. The document and the sheet may be substantially the same.

As illustrated in FIG. 1, the opening and closing unit 9 is supported to be able to oscillate around an opening and closing axis X9 extending in the left and right direction by a hinge, which is not illustrated and disposed at a rear end part of the main body unit 8. The opening and closing unit 9 covers the document supporting surface 8A and the reading surface 8B from above in a closed state illustrated in FIGS. 1 and 5 and the like. Although illustration is omitted, the opening and closing unit 9 is displaced to an open position where the document supporting surface 8A and the reading surface 8B are exposed by oscillating around the opening and closing axis X9 so that the front end part thereof is displaced upward and rearward. Accordingly, a user can support the document which is an object to be read on the document supporting surface 8A.

Further, when describing a configuration, an internal structure and the like of the opening and closing unit 9, a posture of the opening and closing unit 9 in a closed state is set as a reference in the up and down direction and the front and rear direction.

The reading unit 3 includes a reading sensor 3S stored at an upper portion in the main body unit 8 as illustrated in FIGS. 2 to 6, a scanning mechanism drive source 3M illustrated in FIG. 4 and a scanning mechanism, which is not illustrated, driven by the scanning mechanism drive source. As the reading sensor 3S, a well-known image reading sensor such as a contact image sensor (CIS), a charge coupled device (CCD) and the like is used.

As illustrated in FIG. 5, the reading sensor 3S is positioned below the document supporting surface 8A and the reading surface 8B. The scanning mechanism, which is not illustrated, is driven by the scanning mechanism drive source 3M when reading the image on the document supported by the document supporting surface 8A, and the reading sensor 3S is reciprocated in the left and right direction below the document supporting surface 8A in the main body unit 8. Further, the scanning mechanism, which is not illustrated, is driven by the scanning mechanism drive source 3M when the reading sensor 3S reads the image on the sheet SH conveyed by the automatic conveyance mechanism 4, and the reading sensor 3S is stopped under the reading surface 8B in the main body unit 8. A position where the reading sensor 3S is stopped under the reading surface 8B is a predetermined stationary reading position.

Figure 6:
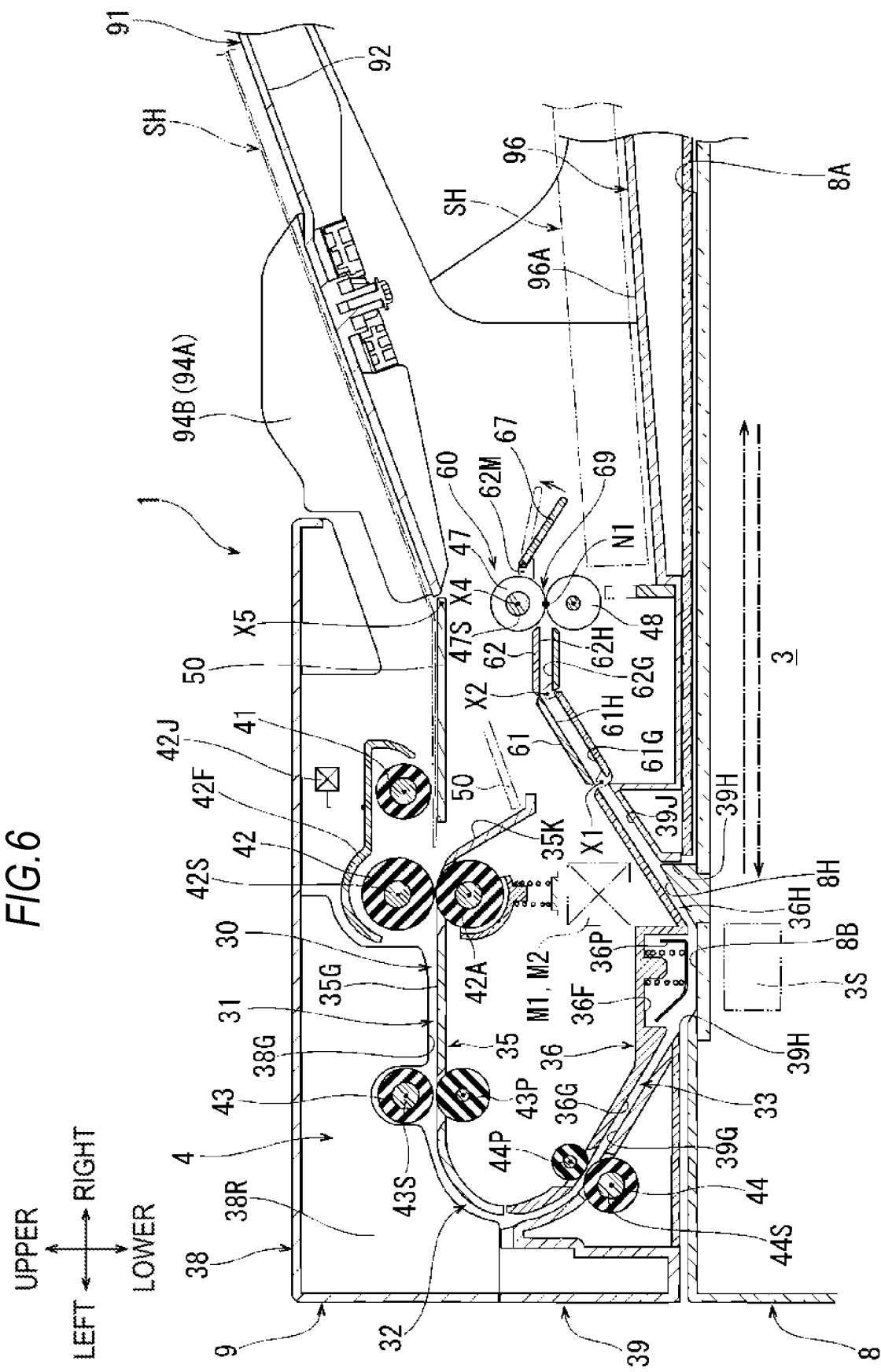
FIG. 6 is a partial cross-sectional view illustrating the image reading apparatus according to the first embodiment.

As illustrated in FIGS. 5 and 6, the opening and closing unit 9 includes a base member 39, a first chute member 35, a second chute member 36 and a cover member 38.

The base member 39 forms a bottom wall of the opening and closing unit 9. In the base member 39, a rectangular hole 39H in which a region opposite to the reading surface 8B and the guide protruding portion 8H is cut out in an approximately rectangular shape is formed. A conveyance surface 39G is formed at a portion positioned on the left side further than the rectangular hole 39H in the base member 39. A left end part of the conveyance surface 39G is curved to be inclined downward to the right by changing a direction from a downward direction. The conveyance surface 39G is inclined downward up to a left end edge of the rectangular hole 39H. A conveyance surface 39J is formed at a portion positioned on the right side further than the rectangular hole 39H in the base member 39. The conveyance surface 39J is adjacent to an upper end edge on the right side of the guide protruding portion 8H of the main body unit 8 and is inclined upward to the right.

The second chute member 36 is disposed above a left portion of the base member 39. A pressing member holding part 36F and guide surfaces 36G and 36H are formed in the second chute member 36.

The pressing member holding part 36F is a recessed portion which is recessed upward at a position opposite to the reading surface 8B. In the pressing member holding unit 36F, a pressing member 36P is held to be able to be displaced in the up and down direction. The pressing member 36P presses the sheet SH conveyed while contacting the reading surface 8B from above, thereby preventing the sheet SH from floating from the reading surface 8B.

The guide surface 36G is positioned on the left side further than the pressing member holding part 36F. A left end part of the guide surface 36G is curved along the left end part of the conveyance surface 39G of the base member 39. The guide surface 36G is inclined downward to the right along a portion inclined downward of the conveyance surface 39G of the base member 39.

The guide surface 36H is positioned on the right side further than the pressing member holding part 36F. The guide surface 36H is inclined upward to the right along the guide protruding portion 8H of the main body unit 8 and the conveyance surface 39J of the base member 39.

The first chute member 35 is disposed above the second chute member 36. A regulation surface 35K and a conveyance surface 35G are formed in the first chute member 35. The regulation surface 35K is inclined upward to the left from a right end part of the first chute member 35. The conveyance surface 35G is connected to an upper end of the regulation surface 35K and extends approximately horizontally to the left. A left end part of the conveyance surface 35G is curved so as to change a direction thereof from the left direction to the downward direction.

The cover member 38 is disposed above the first chute member 35. A guide surface 38G which is formed by lower end edges of a plurality of ribs 38R protruding downward is formed in the cover member 38. A right end part of the guide surface 38G is opposite to the conveyance surface 35G from above at a position deviated to the left side further than a connection unit between the regulation surface 35K and the conveyance surface 35G in the first chute member 35. The guide surface 38G extends approximately horizontally to the left along the conveyance surface 35G of the first chute member 35. A left end part of the guide surface 38G is curved along the left end part of the conveyance surface 35G of the first chute member 35.

Figure 7:
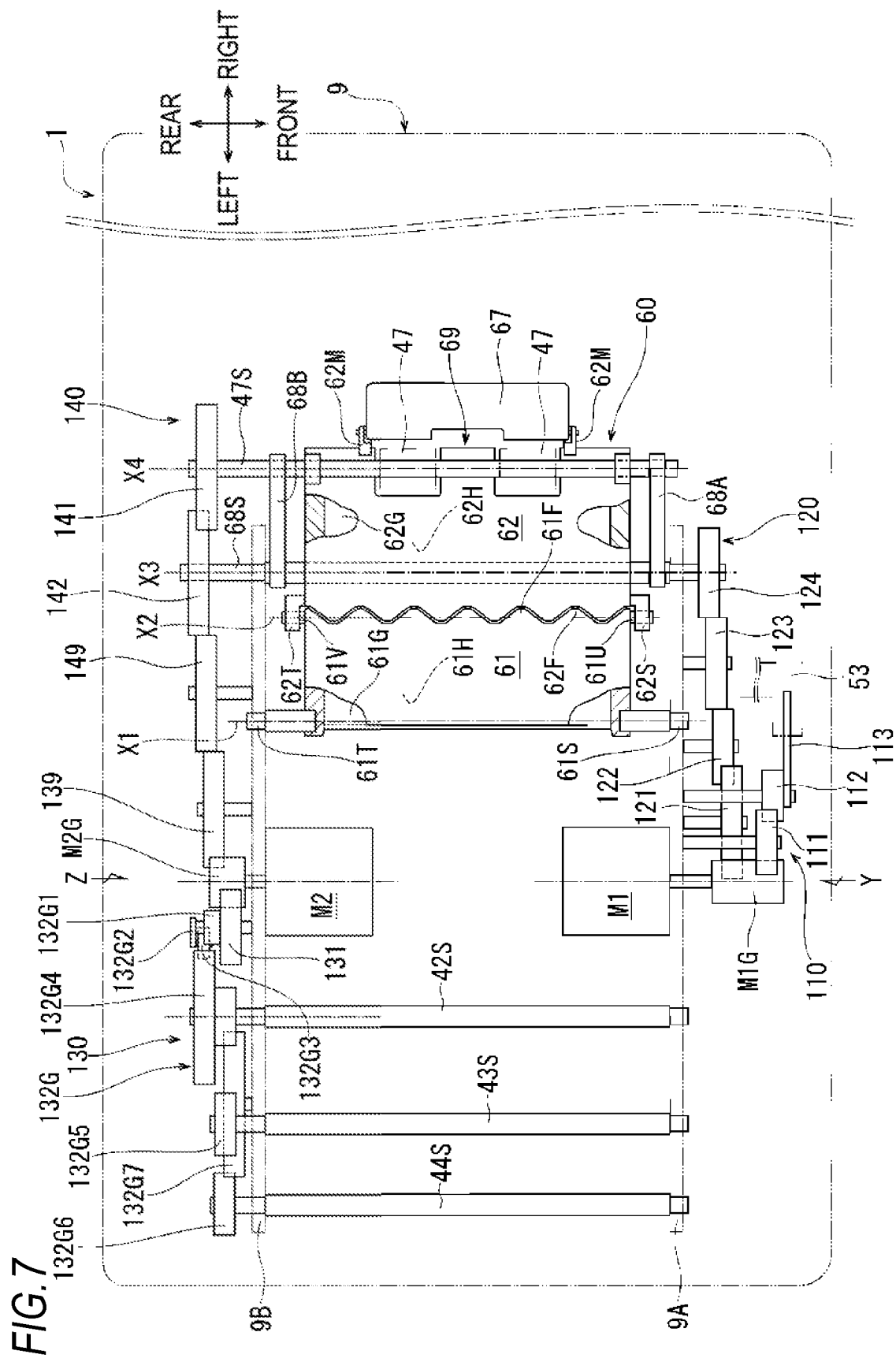
FIG. 7 is a schematic top view illustrating the image reading apparatus according to the first embodiment.

As illustrated in FIG. 7, the opening and closing unit 9 is includes a first side frame 9A and a second side frame 9B. The first side frame 9A and the second side frame 9B is one example of the "frame member" of this disclosure. The first side frame 9A is disposed to extend in the left and right direction on the front side of the opening and closing unit 9 and forms a part of an internal frame of the opening and closing unit 9. The second side frame 9B is disposed to extend in the left and right direction on the rear surface side of the opening and closing unit 9 and forms a part of the internal frame of the opening and closing unit 9.

The first side frame 9A and the second side frame 9B are opposite to each other in the front and rear direction so that the guide surface 38G of the cover member 38, the regulation surface 35K and the conveyance surface 35G of the first chute member 35, the guide surfaces 36G and 36H of the second chute member 36 and the conveyance surfaces 39G, 39J of the base member 39, all of which are illustrated in FIG. 5, are sandwiched therebetween.

Further, in FIG. 7, illustration of a supply tray main body 92 and a movable plate 50 of the supply tray 91 is omitted for ease of description. Additionally, FIG. 7 illustrates that positions of a first drive source M1 and a second drive source M2 are deviated to the right side from a position lower than a rotation shaft 42S of a separation roller 42 for ease of description. Also, FIG. 8 illustrates that the position of the second drive source M2 is deviated to the right side from the position lower than the rotation shaft 42S of the separation roller 42.

As illustrated in FIGS. 2, 3, 5, and 6, the opening and closing unit 9 includes the conveyance guide 30 forming a unit of the automatic conveyance mechanism 4, the supply tray 91 for supporting the sheet SH supplied to the conveyance guide 30 and a discharge tray 96 for supporting the sheet SH discharged from the conveyance guide 30.

As illustrated in FIG. 5, the supply tray 91 is positioned on the right side further than the first chute member 35 and is disposed above a right portion of the base member 39. The supply tray 91 includes the supply tray main body 92 and the movable plate 50. The supply tray main body 92 is gently inclined downward from a right end part side of the opening and closing unit 9 to the left. The movable plate 50 is disposed to be adjacent to a left end part of the supply tray main body 92. The movable plate 50 extends in an approximately flat plate shape toward the regulation surface 35K of the first chute member 35. The movable plate 50 is covered with a right portion of the cover member 38 from above. The supply tray 91 supports the sheet SH supplied to the automatic conveyance mechanism 4 by the supply tray main body 92 and the movable plate 50.

The movable plate 50 is rotatably supported around a third axis X3, the right end part of which extends in the front and rear direction. Even though illustration is omitted, the movable plate 50 is rotatably supported by the first side frame 9A and the second side frame 9B illustrated in FIG. 7.

Figure 3:
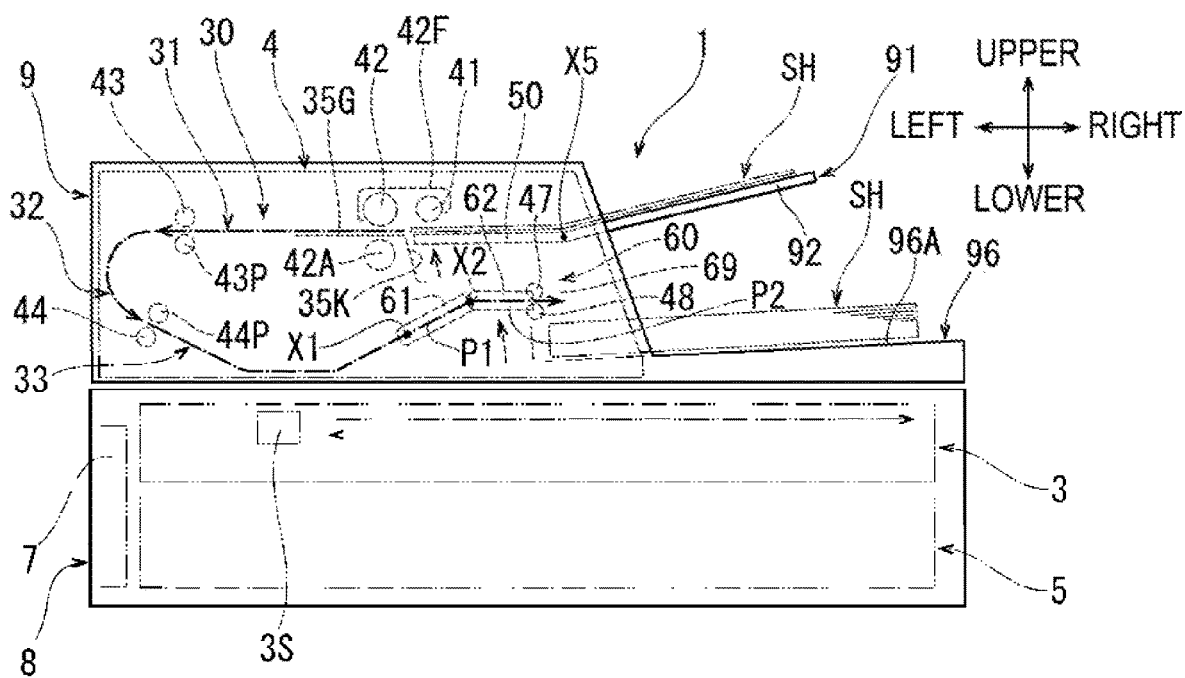
FIG. 3 is a schematic front view illustrating the image reading apparatus according to the first embodiment.

As will be described later in detail, the movable plate 50 is configured to rotate from a first position illustrated in FIGS. 2, 5 and 9 to a second position illustrated in FIGS. 3, 6 and 10 by operating the first drive source M1 and a first drive train 110 illustrated in FIGS. 7 and 9 and the like according to the decrease of the sheets SH supported by the supply tray 91. The second position illustrated in FIG. 6 and the like is a position above the first position illustrated in FIG. 5 and the like. In other words, the second position is higher than the first position.

As illustrated in FIGS. 1 and 5, two width regulation guides 94A and 94B are provided on the supply tray main body 92 to be respectively slidable in the front and rear direction. A plurality of types of the sheets SH having a different size supported by the supply tray 91 are sandwiched from the front side and the rear side in such a manner that the front width regulation guide 94A and the rear width regulation guide 94B approach each other or are separated from each other. Accordingly, the sheets SH having various sizes can be determined to be positioned based upon a center part in a width direction of the supply tray 91 as a reference.

As illustrated in FIG. 5, the discharge tray 96 is formed on the right portion of the base member 39. That is, the discharge tray 96 is provided so as to be overlapped with the supply tray 91 at a position lower than the supply tray 91. In the discharge tray 96, the sheet SH of which image is read by the reading sensor 3S and which is conveyed by the automatic conveyance mechanism 4 is discharged. An upper surface of the discharge tray 96 is a sheet supporting surface 96A for supporting the sheet SH to be discharged.

The conveyance guide 30 forms a conveyance path for conveying the sheet SH from the supply tray 91 toward the discharge tray 96. Specifically, the conveyance guide 30 includes a first guide 31, a second guide 32 and a third guide 33.

The first guide 31 is configured to include an approximately horizontally extending portion of the conveyance surface 35G of the first chute member 35 and an approximately horizontally extending portion of the guide surface 38G of the cover member 38. The first guide 31 guides the sheet SH sent out from the supply tray 91 to the left.

The second guide 32 is configured to include a curved left end part of the conveyance surface 35G of the first chute member 35; a curved left end part of the guide surface 38G of the cover member 38; a curved left end part of the conveyance surface 39G of the base member 39; and a curved left end part of the guide surface 36G of the second chute member 36. The second guide 32 is connected to the first guide 31 and changes the conveyance direction of the sheet SH from the left direction to the right direction.

The third guide 33 is configured to include a downwardly inclined portion of the conveyance surface 39G of the base member 39; a downwardly inclined portion of the guide surface 36G of the second chute member 36; conveyance surface 39J of the base member 39; and the guide surface 36H of the second chute member 36. The third guide 33 is connected to the second guide 32 and guides the sheet SH toward the discharge tray 96.

<Configurations of Discharge Unit and Link Arm>

As illustrated in FIGS. 5 to 7 and FIGS. 11 to 13, the automatic conveyance mechanism 4 includes a discharge unit 60 for discharging the sheet SH guided by the third guide 33 to the discharge tray 96. The discharge unit 60 includes a first discharge guide 61, a second discharge guide 62, a discharge roller 47, a discharge pinch roller 48, and a flapper 67, all of which are unitized. Further, as illustrated in FIGS. 7 and 9 to 11, the automatic conveyance mechanism 4 includes the discharge unit 60, and link arms 68A and 68B that are provided between the first side frame 9A and the second side frame 9B.

Figure 11:
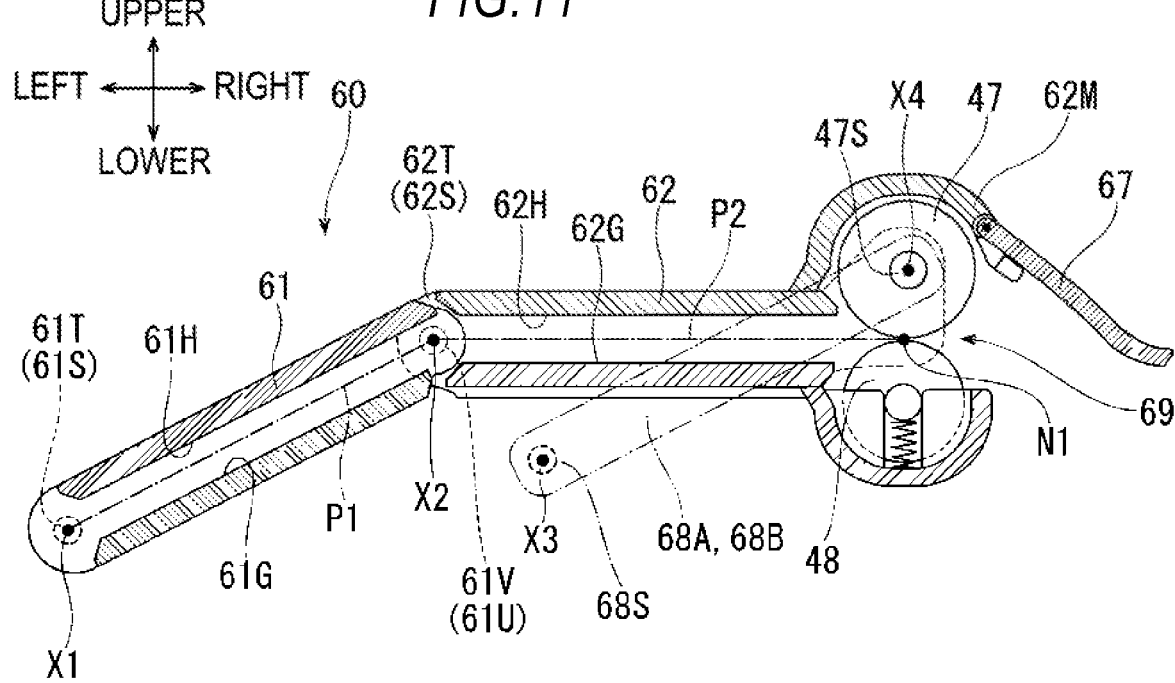
FIG. 11 is a cross-sectional diagram illustrating the discharge unit in which a first discharge guide, a second discharge guide, a discharge roller, a discharge pinch roller, and a flapper are unitized.

As illustrated in FIGS. 5 and 11, and the like, a conveyance surface 61G and a guide surface 61H are formed in the first discharge guide 61. The conveyance surface 61G is positioned on the right side further than the conveyance surface 39J of the base member 39 and is inclined upward to the right. The guide surface 61H is positioned on the right side further than the guide surface 36H of the second chute member 36. The guide surface 61H is inclined upward to the right along the conveyance surface 61G.

As illustrated in FIG. 7, in the first discharge guide 61, a flat plate on which the conveyance surface 61G is formed and a flat plate on which the guide surface 61H is formed are opposite to each other in the up and down direction, and the first discharge guide 61 is formed as an approximately rectangular tubular-shaped member in which front end edges and rear end edges of both flat plates are connected by a pair of side plates on the front and rear sides. The first discharge guide 61 includes shaft units 61S and 61T having a first axis X1 extending in the front and rear direction as an axis. The first axis X1 is parallel with the fifth axis X5.

The front shaft unit 61S is a cylindrical shaft protruding forward from a front and left corner part of the conveyance surface 61G and the guide surface 61H. The front shaft unit 61S is rotatably supported by the first side frame 9A. The rear shaft unit 61T is a cylindrical shaft protruding rearward from a rear and left corner part of the conveyance surface 61G and the guide surface 61H. The rear shaft unit 61T is rotatably supported by the second side frame 9B. Accordingly, the first discharge guide 61 is rotatable around the first axis X1.

As illustrated in FIGS. 5, 7, and 11, and the like, a conveyance surface 62G and a guide surface 62H are formed in the second discharge guide 62. The conveyance surface 62G is positioned on the right side further than the conveyance surface 61G of the first discharge guide 61 and horizontally extends to the right. The guide surface 62H is positioned on the right side further than the guide surface 61H of the first discharge guide 61 and horizontally extends to the right.

As illustrated in FIG. 7, in the second discharge guide 62, a flat plate on which the conveyance surface 62G is formed and a flat plate on which the guide surface 62H is formed are opposite to each other in the up and down direction, and the second discharge guide 62 is formed as an approximately rectangular tubular-shaped member in which front end edges and rear end edges of both flat plates are connected by a pair of side plates on the front and rear sides.

The second discharge guide 62 includes connection protruding portions 62S and 62T. The front connection protruding portion 62S protrudes to the left after protruding forward from a front and left corner part of the conveyance surface 62G and the guide surface 62H. The rear connection protruding portion 62T protrudes to the left after protruding rearward from a rear and left corner part of the conveyance surface 62G and the guide surface 62H.

The first discharge guide 61 includes shaft units 61U and 61V having a second axis X2 parallel with the first axis X1 as an axis. The front shaft unit 61U is a cylindrical shaft protruding forward from a front and right corner part of the conveyance surface 61G and the guide surface 61H. The rear shaft unit 61V is a cylindrical shaft protruding rearward from a rear and right corner part of the conveyance surface 61G and the guide surface 61H.

The front shaft unit 61U of the first discharge guide 61 is rotatably inserted into a shaft hole formed in the front connection protruding portion 62S of the second discharge guide 62. The rear shaft unit 61V of the first discharge guide 61 is rotatably inserted into a shaft hole formed in the rear connection protruding portion 62T of the second discharge guide 62. Accordingly, the second discharge guide 62 is connected to the first discharge guide 61 to be rotatable around the second axis X2.

As illustrated in FIGS. 5 and 11, and the like, the second discharge guide 62 includes a discharge opening 69 for discharging the sheet SH to the discharge tray 96. The discharge opening 69 is opened between a right end part of the conveyance surface 62G and a right end part of the guide surface 62H.

The discharge roller 47 is disposed upward with respect to the discharge opening 69. The discharge pinch roller 48 is disposed downward with respect to the discharge opening 69. Although the illustration is omitted, a plurality of sets of the discharge rollers 47 and the discharge pinch rollers 48 are arranged to have intervals each other in the front and rear direction.

As illustrated in FIG. 7, the discharge roller 47 is fixed to a rotation shaft 47S having a fourth axis X4 which is parallel with the first axis X1 as an axis. A front end part side of the rotation shaft 47S is rotatably supported at a front and right corner part of the second discharge guide 62. The front end part of the rotation shaft 47S protrudes forward further than the second discharge guide 62. A rear end part side of the rotation shaft 47S is rotatably supported at a rear and right corner part of the second discharge guide 62. The rear end part of the rotation shaft 47S protrudes rearward further than the second discharge guide 62 and protrudes rearward further than the second side frame 9B. Accordingly, the discharge roller 47 is supported by the second discharge guide 62 to be rotatable around the fourth axis X4.

The front and rear direction which is the direction that the rotation shaft 47S of the discharge roller 47 extends is an example of "an axial direction of the discharge roller". As illustrated in FIG. 11, the fourth axis X4 of the discharge roller 47 deviates upward further than an upper surface of the second discharge guide 62.

The discharge pinch roller 48 is rotatably supported at a right end part of the second discharge guide 62 and is opposite to the discharge roller 47 from below. The discharge pinch roller 48 is pressed against the discharge roller 47, and contacts with the discharge roller 47 at a nip position N1.

Figure 12:
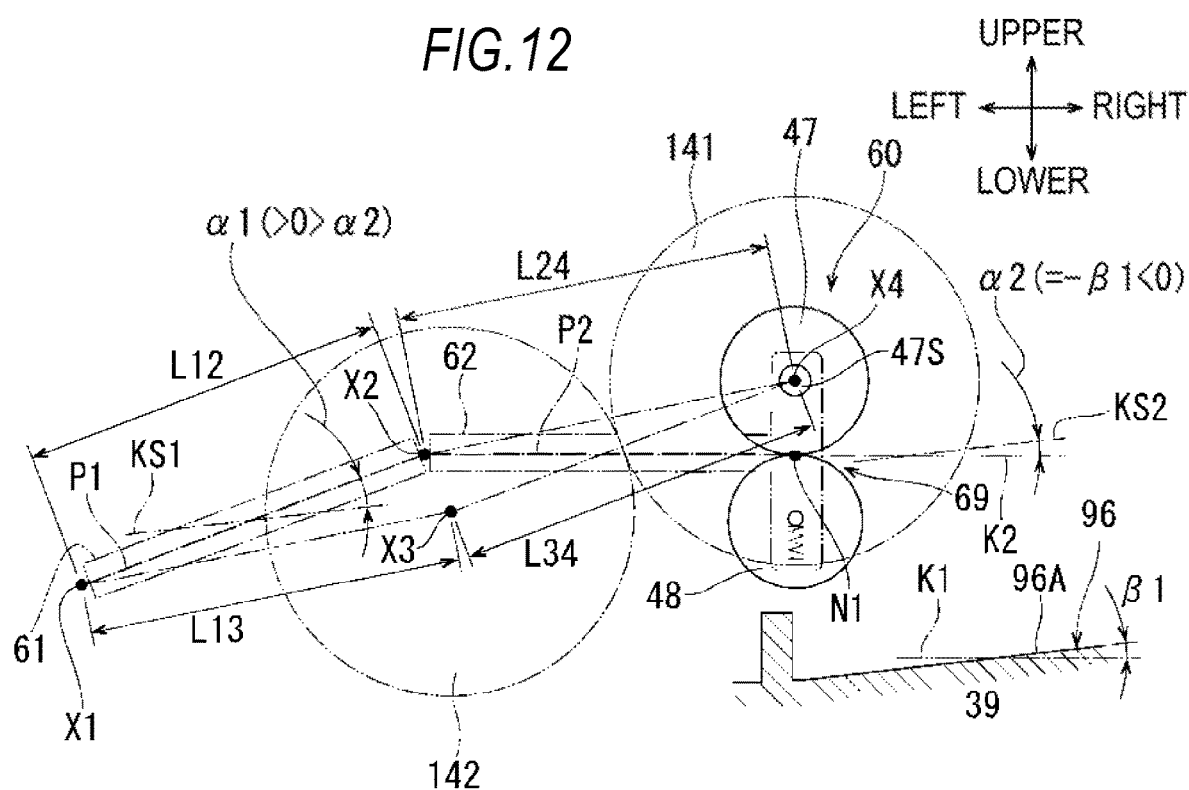
FIG. 12 is a schematic diagram explaining a relative relationship among the first discharge guide, the second discharge guide, the discharge roller, the discharge pinch roller, and a discharge tray in a state in which the discharge unit is at the third position.
Figure 13:
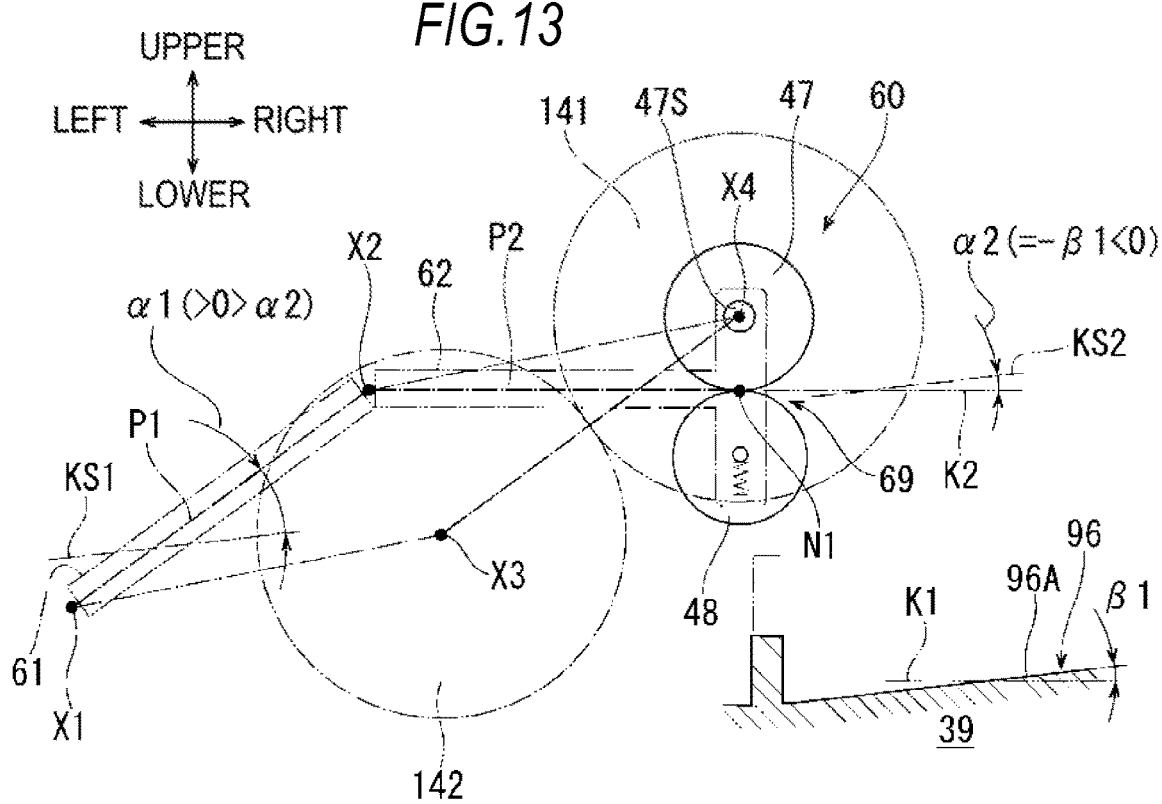
FIG. 13 is a schematic diagram explaining a relative relationship among the first discharge guide, the second discharge guide, the discharge roller, the discharge pinch roller, and the discharge tray in a state in which the discharge unit is at the fourth position.

As illustrated in FIGS. 11 to 13, a first discharge path P1 for guiding the sheet SH conveyed by the conveyance guide 30 is formed by the conveyance surface 61G and the guide surface 61H of the first discharge guide 61. The first discharge path P1 is a path extending from the first axis X1 up to the second axis X2.

A second discharge path P2 for guiding the sheet SH guided by the first discharge guide 61 toward the discharge tray 96 is formed by the conveyance surface 62G and the guide surface 62H of the second discharge guide 62. The second discharge path P2 is a path horizontally extending from the second axis X2 up to the nip position N1.

That is, a position of the first axis X1 and a position of the second axis X2 are set at positions that are overlapped with the conveyance paths formed by the third guide 33 of the conveyance guide 30, the first discharge guide 61, and the second discharge guide 62.

As illustrated in FIG. 7, the front link arm 68A is disposed between the first side frame 9A and the discharge unit 60 in the front and rear direction. The rear link arm 68B is disposed between the second side frame 9B and the discharge unit 60 in the front and rear direction.

The link arms 68A and 68B are fixed to a link arm rotation shaft 68S having a third axis X3 which is parallel with the first axis X1 as an axis. The link arm rotation shaft 68S is supported by the first side frame 9A and the second side frame 9B to be rotatable around the third axis X3. A front end part of the link arm rotation shaft 68S protrudes forward further than the first side frame 9A. A rear end part of the link arm rotation shaft 68S protrudes rearward further than the second side frame 9B. Accordingly, the link arms 68A and 68B are rotatable around the third axis X3.

As illustrated in FIG. 11, the link arms 68A and 68B extend to be separated upward and rightward from the link arm rotation shaft 68S. As illustrated in FIG. 7, the front end part of the rotation shaft 47S of the discharge roller 47 is rotatably inserted into a shaft hole formed at an upper end part of the front link arm 68A. The rear end part of the rotation shaft 47S of the discharge roller 47 is rotatably inserted into a shaft hole formed at an upper end part of the rear link arm 68B. Accordingly, the link arms 68A and 68B are connected to the second discharge guide 62 to be rotatable around the fourth axis X4 which is a rotation axis of the discharge roller 47.

As will be described later in detail, the discharge unit 60 is configured to move from a third position illustrated in FIGS. 2, 5, and 12 to a fourth position illustrated in FIGS. 3, 6, and 13 by operating the first drive source M1 and a first drive train 120, which are illustrated in FIGS. 7 and 9, and the like according to the decrease of the sheets SH supported by the supply tray 91. The fourth position illustrated in FIG. 6 and the like is a position above the third position illustrated in FIG. 5 and the like.

As illustrated in FIG. 7, the first axis X1, the second axis X2, the third axis X3 and the fourth axis X4 are parallel with each other. As illustrated in FIG. 12, a distance L12 between the first axis X1 and the second axis X2, and a distance L34 between the third axis X3 and the fourth axis X4 are equal to each other. Further, a distance L13 between the first axis X1 and the third axis X3 and a distance L24 between the second axis X2 and the fourth axis X4 are equal to each other.

Accordingly, when the discharge unit 60 moves from the third position illustrated in FIG. 12 to the fourth position illustrated in FIG. 13, a rectangle having the first axis X1, the second axis X2, the third axis X3, and the fourth axis X4 as four apexes is always a parallelogram. That is, the first discharge guide 61, the second discharge guide 62, the link arms 68A and 68B, the first side frame 9A, and the second side frame 9B form a parallelogram link.

As illustrated in FIGS. 12 and 13, a virtual line K1 is a straight line horizontally extending in the left and right direction and intersects with the sheet supporting surface 96A. A virtual line K2 is an extension line of the second discharge path P2 and is a straight line horizontally extending in the left and right direction.

The sheet supporting surface 96A is gently inclined upward to the right. An angle at which the sheet supporting surface 96A is inclined with respect to the horizontal virtual line K1 is an inclination angle β1. Virtual lines KS1 and KS2 are straight lines extending in parallel with the sheet supporting surface 96A in the left and right direction.

An angle at which the first discharge path P1 of the first discharge guide 61 is inclined with respect to the sheet supporting surface 96A in the discharge tray 96 is a first inclination angle α1.

An angle at which the second discharge path P2 of the second discharge guide 62 is inclined with respect to the sheet supporting surface 96A in the discharge tray 96 is a second inclination angle α2.

The first inclination angle α1, the second inclination angle α2, and the inclination angle β1 have a relationship as follows:

$$\alpha 1 > 0 > \alpha 2 = -\beta 1$$

When the link arms 68A and 68B rotate upward and the discharge unit 60 moves from the third position illustrated in FIG. 12 to the fourth position illustrated in FIG. 13, the first inclination angle α1 increases, whereas the second inclination angle α2 is constant. Therefore, the second discharge path P2 is maintained in a horizontal state. In other words, the discharge unit 60 is configured to move while maintaining a state in which the second inclination angle α2 is smaller than the first inclination angle α1.

Further, a fact that the second inclination angle α2 is constant means that the second inclination angle α2 is substantially constant. Even a case when the second inclination angle α2 slightly increases or decreases due to a manufacturing error of components, looseness of a connection portion, or the like is included in the fact that "the second inclination angle α2 is constant".

As illustrated in FIG. 7, a plurality of protruding portions 61F are formed to protrude to the right at a right end part of the first discharge guide 61. The right end part of the first discharge guide 61 is an example of "a first end part opposite to the second discharge guide in the first discharge guide" of this disclosure.

A plurality of recessed portions 62F are formed be recessed to the right at a left end part of the second discharge guide 62. Each protruding portion 61F enters into each recessed portion 62F. The left end part of the second discharge guide 62 is an example of "a second end part opposite to a first end part of the first discharge guide in the second discharge guide" of this disclosure.

When the link arms 68A and 68B rotate upward and the discharge unit 60 moves from the third position illustrated in FIG. 12 to the fourth position illustrated in FIG. 13, the state in which each protruding portion 61F enters into each recessed portion 62F is maintained.

As illustrated in FIGS. 7 and 11, the flapper 67 is rotatably supported by a flapper support part 62M provided at a right end part of the second discharge guide 62. The flapper 67 is in a state of being inclined downward to the right by the own weight. In this state, a right end of the flapper 67 is positioned below the discharge opening 69. The flapper 67 abuts on the sheet SH discharged from the discharge opening 69 from above and guides the sheet SH toward the sheet supporting surface 96A of the discharge tray 96.

As illustrated in FIG. 5, the automatic conveyance mechanism 4 includes a supply roller 41, the separation roller 42, a retard roller 42A, a first conveyance roller 43, a first pinch roller 43P, a second conveyance roller 44, a second pinch roller 44P, the discharge roller 47 and the discharge pinch roller 48 for conveying the sheet SH along the conveyance guide 30. The discharge roller 47 and the discharge pinch roller 48 are a part of the above-mentioned discharge unit 60.

As illustrated in FIG. 7, the rotation shaft 42S of the separation roller 42, a rotation shaft 43S of the first conveyance roller 43 and a rotation shaft 44S of the second conveyance roller 44 are rotatably supported by the first side frame 9A and the second side frame 9B. Respective rear end parts of the rotation shafts 42S, 43S and 44S protrude rearward further than the second side frame 9B.

<Configuration of Second Drive Source and Conveyance Drive Train>

As illustrated in FIGS. 7 and 8, the automatic conveyance mechanism 4 includes 130 for driving the supply roller 41, the separation roller 42, the first conveyance roller 43, the second conveyance roller 44 and the discharge roller 47. Further, in the embodiment, with respect to each gear forming the second drive source M2 and the conveyance drive train 130, illustration of gear teeth formed on the outer peripheral surface is omitted in FIGS. 7 and 8 and the like.

As illustrated in FIG. 5, the second drive source M2 is disposed between the first guide 31 and the third guide 33. As illustrated in FIG. 7, the second drive source M2 is mounted on a surface facing a front side of the second side frame 9B. A drive shaft of the second drive source M2 protrudes rearward further than the second side frame 9B and a drive gear M2G is fixed to the drive shaft. In the embodiment, the second drive source M2 is a stepping motor. The second drive source M2 is controlled by the controller 7 to generate a drive force, thereby rotating the drive gear M2G clockwise in FIG. 8.

As illustrated in FIGS. 7 and 8, the conveyance drive train 130 is disposed behind the second side frame 9B and is supported by a plurality of shaft units protruding rearward from the second side frame 9B. The conveyance drive train 130 includes a gear 131 which is positioned on a left and upper side with respect to the drive gear M2G and is engaged with the drive gear M2G; and a plurality of gear groups 132G which transmit a drive force from the second drive source M2 via the gear 131.

The plurality of gear groups 132G include a sun gear 132G1 integrally rotating with the gear 131 and a planetary gear 132G3 connected to the sun gear 132G1 by an arm 132G2. Further, the plurality of gear groups 132G include gears 132G4, 132G5, 132G6 and 132G7. The gear 132G4 is engaged with the planetary gear 132G3, thereby integrally rotating with the rotation shaft 42S of the separation roller 42. The gear 132G5 transmits the drive force from the gear 132G4 via the gear 132G7, thereby integrally rotating with the rotation shaft 43S of the first conveyance roller 43. The gear 132G6 transmits the drive force from the gear 132G4 via the gear 132G7, thereby integrally rotating with the rotation shaft 44S of the second conveyance roller 44.

Further, when the jammed sheet SH is removed in the conveyance guide 30, the gears 132G4, 132G5 and 132G6 become free to rotate by separating the planetary gear 132G3 from the gear 132G4. As a result, the jammed sheet SH can be easily removed.

The plurality of gear groups 132G transmit the drive force from the second drive source M2 to the rotation shaft 42S of the separation roller 42, the rotation shaft 43S of the first conveyance roller 43 and the rotation shaft 44S of the second conveyance roller 44 and rotate the separation roller 42, the first conveyance roller 43 and the second conveyance roller 44, in a direction in which the sheet SH is conveyed toward the reading sensor 3S stopped at a stationary reading position, that is, counter-clockwise illustrated in FIG. 8.

Further, the conveyance drive train 130 includes a second drive train 140 that transmits the drive force from the second drive source M2 to the discharge roller 47. The second drive train 140 includes a gear 139, a gear 149, a second gear 142, and a first gear 141. The first gear 141 is an example of "a first rotation body" of this disclosure. The second gear 142 is an example of "a second rotation body" of this disclosure.

The gear 139 is positioned on the right side with respect to the drive gear M2G and is engaged with the drive gear M2G. The gear 149 is positioned on the right side with respect to the gear 139 and is engaged with the gear 139. The second gear 142 is inserted into the rear end part of the link arm rotation shaft 68S to be rotatable independently. Accordingly, the second gear 142 is rotatable around the third axis X3 independently from the link arms 68A and 68B. The second gear 142 is positioned on the right side with respect to the gear 149 and is engaged with the gear 149. The first gear 141 is fixed to the rear end part of the rotation shaft 47S of the discharge roller 47 and is rotatable around the fourth axis X4 together with the rotation shaft 47S of the discharge roller 47. The first gear 141 is engaged with the second gear 142.

The gears 139 and 149, the second gear 142, and the first gear 141 transmit the drive force from the second drive source M2 to the rotation shaft 47S of the discharge roller 47, and then rotate the discharge roller 47 in a direction in which the sheet SH is discharged to the discharge tray 96, that is, clockwise in FIG. 8.

The link arms 68A and 68B illustrated in FIGS. 7 and 8, and the like support the rotation shaft 47S of the discharge roller 47 to be rotatable around the fourth axis X4 while keeping the distance L34 between the third axis X3 and the fourth axis X4 illustrated in FIG. 12 constant. Accordingly, when the link arms 68A and 68B rotate upward and the discharge unit 60 moves from the third position illustrated in FIG. 12 to the fourth position illustrated in FIG. 13, the engagement between the second gear 142 and the first gear 141 can be maintained within an appropriate range, and the drive force can be appropriately transmitted from the second gear 142 to the first gear 141.

<Configuration Supply Roller, Retard Roller, First Conveyance Roller and Second Conveyance Roller>

As illustrated in FIG. 5, the separation roller 42 is disposed at a position deviated on the left side further than the connection part between the regulation surface 35K and the conveyance surface 35G in the first chute member 35.

A holder 42F is rotatably supported in the rotation shaft 42S of the separation roller 42. The holder 42F protrudes rightward to be separated from the rotation shaft 42S and to exceed the regulation surface 35K.

The supply roller 41 is rotatably held at a right end part of the holder 42F. The supply roller 41 is provided at a position opposite to the movable plate 50 from above. The rotation shaft 42S and a transmission gear group, which is not illustrated and provided in the holder 42F, transmit the drive force from the second drive source M2 to the supply roller 41, thereby rotating the supply roller 41 in a direction in which the sheet SH supported by the supply tray 91 is sent out to the conveyance guide 30. The supply roller 41 can be displaced in the up and down direction depending on the rotation of the holder 42F.

A holder posture detection sensor 42J is provided in the opening and closing unit 9. The holder posture detection sensor 42J detects whether or not a posture of the holder 42F is an appropriate posture illustrated in FIGS. 5 and 6 and then transmits the detected posture thereof to the controller 7. In a state where the holder 42F is in the appropriate posture illustrated FIGS. 5 and 6, a lower end part of the supply roller 41 has approximately the same height as that of the conveyance surface 35G of the first chute member 35. In this state, the supply roller 41 can appropriately send out the uppermost sheet SH among the sheets SH supported by the supply tray 91 toward the conveyance surface 35G, that is, toward a space between the separation roller 42 and the retard roller 42A.

The retard roller 42A is supported by the first chute member 35 at a position just below the separation roller 42 and is pressed against the separation roller 42. When there exists one sheet SH to be nipped by the separation roller 42 and the retard roller 42A, rotation of the retard roller 42A is allowed by a torque limiter which is not illustrated. On the other hand, when there exist a plurality of sheets SH to be nipped by the separation roller 42 and the retard roller 42A, the rotation of the retard roller 42A is stopped by the torque limiter which is not illustrated. As a result, the retard roller 42A applies a force for stopping the conveyance of the sheet SH with respect to the sheet SH other than the sheet SH in contact with the separation roller 42.

The first conveyance roller 43 is disposed at a connection part between the first guide 31 and the second guide 32 to be opposite to the conveyance surface 35G of the first chute member 35 from above. The first pinch roller 43P is supported by the first chute member 35 and is pressed against the first conveyance roller 43. The first conveyance roller 43 and the first pinch roller 43P nip the sheet SH separated one by one by the separation roller 42 and the retard roller 42A and then convey the nipped sheet SH toward the second guide 32.

The second conveyance roller 44 is disposed at a connection part between the second guide 32 and the third guide 33 to be opposite to the guide surface 36G of the second chute member 36 from below. The second pinch roller 44P is supported by the second chute member 36 and is pressed against the second conveyance roller 44. The second conveyance roller 44 and the second pinch roller 44P nip the sheet SH to be conveyed by the first conveyance roller 43 and the first pinch roller 43p and then convey the nipped sheet SH toward the reading surface 8B, that is, toward the reading sensor 3S which is stopped at the stationary reading position.

The discharge roller 47 and the discharge pinch roller 48 nip the sheet SH that passes over the reading surface 8B and is guided by the first discharge guide 61 and the second discharge guide 62 at the nip position N1 and then discharge the sheet SH from the discharge opening 69 toward the discharge tray 96.

<Configurations of First Drive Source, First Drive Train, and Third Drive Train>

As illustrated in FIGS. 7 and 9, and the like, the automatic conveyance mechanism 4 includes the first drive source M1, the first drive train 120 and the third drive train 110 for performing a moving operation of the movable plate 50 and the discharge unit 60. Further, in the embodiment, with respect to each gear forming the first drive source M1, the first drive train 120, and the third drive train 110, the illustration of gear teeth formed on the outer peripheral surface is omitted in FIGS. 7 and 9, and the like.

As illustrated in FIG. 5, the first drive source M1 is disposed between the first guide 31 and the third guide 33. As illustrated in FIG. 7, the first drive source M1 is mounted on a surface facing the rear side of the first side frame 9A. A drive shaft of the first drive source M1 protrudes forward further than the first side frame 9A, and a drive gear M1G is fixed to the drive shaft. In the embodiment, the first drive source M1 is a stepping motor. The first drive source M1 is controlled by the controller 7 to generate the drive force, thereby rotating the drive gear M1G clockwise and counter-clockwise in FIGS. 9 and 10.

Figure 10:
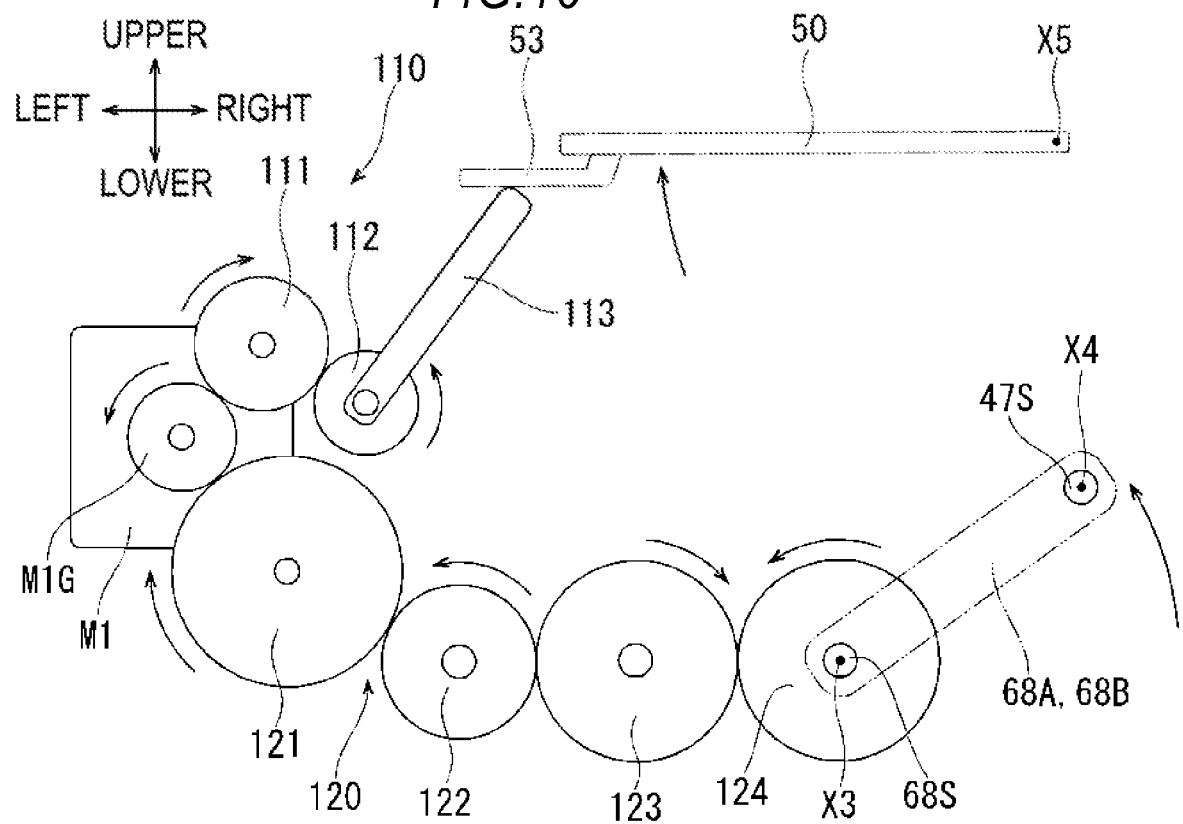
FIG. 10 is a schematic diagram same as that of FIG. 9, and is a diagram illustrating a state in which the movable plate moves to a second position, and the link arm moves to a position corresponding to a fourth position of the discharge unit.

A plurality of arrows illustrated in FIGS. 9 and 10 indicate a rotation direction when the drive gear M1G rotates counter-clockwise in FIGS. 9 and 10. Further, when the drive gear M1G rotates clockwise in FIGS. 9 and 10, the rotation direction becomes a rotation direction opposite to each arrow illustrated in FIGS. 9 and 10.

As illustrated in FIGS. 7 and 9, the first drive train 120 and the third drive train 110 are disposed forward further than the first side frame 9A and are supported by a plurality of shaft units protruding forward from the first side frame 9A.

The third drive train 110 includes a gear 111, a gear 112, and an arm 113. The gear 111 is positioned rightward and upward with respect to the drive gear M1G and is engaged with the drive gear M1G. The gear 112 is positioned rightward and downward with respect to the gear 111 and is engaged with the gear 111. The arm 113 is fixed to a surface facing a front side of the gear 112 and protrudes to the right.

The movable plate 50 includes a passive unit 53. The passive unit 53 is bent after protruding forward from a front and left corner part of a rear surface of the movable plate 50, protrudes to the left, and abuts on a right end part of the arm 113 from above.

The first drive train 120 includes a gear 121, a gear 122, a gear 123, and a gear 124. The gear 121 is positioned rightward and downward with respect to the drive gear M1G and is engaged with the drive gear M1G. The gear 122 is positioned rightward with respect to the gear 121 and is engaged with the gear 121. The gear 123 is positioned rightward with respect to the gear 122 and is engaged with the gear 122.

The gear 124 is fixed to the front end part of the link arm rotation shaft 68S. The gear 124 is positioned rightward with respect to the gear 123 and is engaged with the gear 123. When the gear 124 rotates, the link arm rotation shaft 68S and the link arms 68A and 68B rotate around the third axis X3.

The first drive train 120 and the third drive train 110 are branched between the first drive source M1, and the gear 111 and the gear 121, that is, are parallel with each other with the drive gear M1G as a branch point. In the embodiment, each gear forming the first drive train 120 and the third drive train 110 is a general gear such as a spur gear, a helical gear, and the like.

Next, an operation of the third drive train 110 will be described.

When the first drive source M1 rotates the drive gear M1G counter-clockwise in FIG. 9, the third drive train 110 transmits a drive force from the first drive source M1 to the movable plate 50 and rotates the movable plate 50 from the first position illustrated in FIG. 5 and the like to the second position illustrated in FIG. 6 and the like.

More specifically, in the third drive train 110, the gear 111 engaged with the drive gear M1G rotates clockwise in FIG. 9; the gear 112 engaged with the gear 111 rotates counter-clockwise in FIG. 9; and a right end part of the arm 113 fixed to the gear 112 ascends. As a result, as illustrated in FIG. 10, since the passive unit 53 of the movable plate 50 is pushed up, the movable plate 50 rotates around the fifth axis X5 to displace a left end part of the movable plate 50 upward, and then moves to the second position illustrated in FIG. 6 and the like.

Further, when the first drive source M1 rotates the drive gear M1G clockwise in FIG. 10, the third drive train 110 is operated in a manner opposite to the above-mentioned operation, and therefore the right end part of the arm 113 descends. As a result, as illustrated in FIG. 9, since the passive unit 53 of the movable plate 50 also descends, the movable plate 50 rotates around the fifth axis X5 to displace the left end part thereof downward, and then moves to the first position illustrated in FIG. 5 and the like.

Next, an operation of the first drive train 120 will be described. When the first drive source M1 rotates the drive gear M1G counter-clockwise in FIG. 9, the first drive train 120 transmits the drive force from the first drive source M1 to the discharge unit 60, thereby moving the discharge unit 60 from the third position illustrated in FIG. 5 and the like to the fourth position illustrated in FIG. 6 and the like.

More specifically, in the first drive train 120, the gear 121 engaged with the drive gear M1G rotates clockwise in FIG. 9; the gear 122 engaged with the gear 121 rotates counter-clockwise in FIG. 9; the gear 123 engaged with the gear 122 rotates clockwise in FIG. 9; and the gear 124 engaged with the gear 123 rotates counter-clockwise in FIG. 9. As a result, as illustrated in FIG. 10, the link arms 68A and 68B rotate upward integrally with the gear 124.

Next, the first discharge guide 61 and the second discharge guide 62 are interlocked with the link arms 68A and 68B, and the discharge unit 60 moves from the third position illustrated in FIG. 12 to the fourth position illustrated in FIG. 13. More specifically, the first discharge guide 61 rotates to increase the first inclination angle α1. Further, the second discharge guide 62 moves upward while the second inclination angle α2 is kept constant. Accordingly, the discharge opening 69 moves upward while the second discharge path P2 is maintained in the horizontal state, and the discharge roller 47, the discharge pinch roller 48, and the flapper 67, all of which are supported by the second discharge guide 62 also move upward integrally with the second discharge guide 62.

Further, when the first drive source M1 rotates the drive gear M1G clockwise in FIG. 10, the first drive train 120 is operated in a manner opposite to the above-mentioned operation, and therefore the gear 124 rotates clockwise in FIG. 10. As a result, as illustrated in FIG. 9, the link arms 68A and 68B rotate downward integrally with the gear 124.

Next, the first discharge guide 61 and the second discharge guide 62 are interlocked with the link arms 68A and 68B, and the discharge unit 60 moves from the fourth position illustrated in FIG. 13 to the third position illustrated in FIG. 12. More specifically, the first discharge guide 61 rotates to decrease the first inclination angle α1. Further, the second discharge guide 62 moves downward while the second inclination angle α2 is kept constant. Accordingly, the discharge opening 69 moves downward while the second discharge path P2 is maintained in the horizontal state, and the discharge roller 47, the discharge pinch roller 48, and the flapper 67, all of which are supported by the second discharge guide 62 also move downward integrally with the second discharge guide 62.

As illustrated in FIG. 5, when the movable plate 50 is in the first position, the left end part of the movable plate 50 is at a position opposite to a lower end part of the regulation surface 35K of the first chute member 35 and an inclination angle of an upper surface of the movable plate 50 is approximately the same as an inclination angle of an upper surface of the supply tray main body 92. In this state, the supply tray 91 can support the sheets SH with the maximum number of stacked sheets. When the movable plate 50 is at the first position and the supply roller 41 abuts on the uppermost sheet SH of the maximum number of stacked sheets SH, the posture of the holder 42F becomes the appropriate posture illustrated in FIG. 5.

As illustrated in FIG. 6, when the movable plate 50 is at the second position, the left end part of the movable plate 50 is at a position opposite to the upper end part of the regulation surface 35K of the first chute member 35 and the upper surface of the movable plate 50 is in a state of extending approximately horizontally at the same height as that of the conveyance surface 35G of the first chute member 35. In this state, the supply tray 91 supports about one to several numbers of the sheets SH. When the movable plate 50 is at the second position and the supply roller 41 abuts on the uppermost sheet SH of the one to several numbers of the sheets SH, the posture of the holder 42F becomes the appropriate posture illustrated in FIG. 6.

When it is determined that the posture of the holder 42F is in a state of descending beyond an allowable range from the appropriate posture illustrated in FIGS. 5 and 6 based on a detection signal of the holder posture detection sensor 42J, the controller 7 operates the first drive source M1 to rotate the movable plate 50 little by little from the first position illustrated in FIG. 5 and the like to the second position illustrated in FIG. 6 and the like, thereby controlling the holder 42F to maintain the appropriate posture illustrated in FIGS. 5 and 6. At this time, it is possible to position the movable plate 50 in a desired rotation posture with high accuracy by finely changing a rotation posture of the arm 113 by rotation angle control of the first drive source M1 which is the stepping motor.

When the controller 7 rotates the movable plate 50 little by little by operating the first drive source M1, the drive force from the first drive source M1 is also transmitted to the discharge unit 60 by the second drive train 120. Accordingly, the discharge unit 60 rotates little by little from the third position illustrated in FIG. 5 and the like to the fourth position illustrated in FIG. 6 and the like in synchronization with the small movement of the movable plate 50. The image reading apparatus 1 achieves miniaturization in the up and down direction by a configuration in which the discharge unit 60 rotates according to the movement of the movable plate 50 of the supply tray 91.

As illustrated in FIG. 5, when the discharge unit 60 is at the third position, the discharge opening 69, the discharge roller 47 and the discharge pinch roller 48 are at positions close to the sheet supporting surface 96A of the discharge tray 96. A state of the discharge unit 60 corresponds to a case in which the number of sheets SH supported by the sheet supporting surface 96A of the discharge tray 96 is small.

As illustrated in FIG. 6, when the discharge unit 60 is at the fourth position, the discharge opening 69, the discharge roller 47 and the discharge pinch roller 48 are at positions separated upward from the sheet supporting surface 96A of the discharge tray 96. A state of the discharge unit 60 corresponds to a case in which the sheets SH are supported by the sheet supporting surface 96A of the discharge tray 96 with the maximum number of stacked sheets. In other words, in this state, the discharge opening 69 of the discharge unit 60 is sufficiently separated upward from the uppermost sheet SH among the sheets SH supported by the sheet supporting surface 96A with the maximum number of stacked sheets.

<Image Reading Operation>

In the image reading apparatus 1, when reading an image on a document supported by the document supporting surface 8A, the controller 7 operates the scanning mechanism, which is not illustrated, by controlling the scanning mechanism drive source 3M of the reading unit 3 and moves the reading sensor 3S in the left and right direction from a reading start position below a left end edge of the document supporting surface 8A to a reading end position below a right end edge thereof. Accordingly, the reading sensor 3S reads the image on the document supported by the document supporting surface 8A. Thereafter, the controller 7 operates the scanning mechanism, which is not illustrated, in a reverse direction by controlling the scanning mechanism drive source 3M of the reading unit 3 and then moves the reading sensor 3S which completes the reading from a right end to a left end in the reading unit 3, thereby returning to a standby position.

Further, in the image reading apparatus 1, the sheet SH supported by the supply tray 91 is conveyed by the automatic conveyance mechanism 4; when reading the image on the sheet SH, the controller 7 operates the scanning mechanism, which is not illustrated, by controlling the scanning mechanism drive source 3M of the reading unit 3; and the reading sensor 3S is stopped at the stationary reading position below the reading surface 8B. Here, it is assumed that the movable plate 50 is at the first position illustrated in FIG. 5 and the like, the discharge unit 60 is at the third position illustrated in FIG. 5 and the like and the sheet SH is in a state of not being supported by the discharge tray 96.

Next, the controller 7 determines whether or not the holder posture detection sensor 42J is in the appropriate posture illustrated in FIGS. 5 and 6 based on the detection signal of the holder posture detection sensor 42J. When the holder posture detection sensor 42J is not in the appropriate posture illustrated in FIGS. 5 and 6, the controller 7 operates the first drive source M1, the first drive train 120, and the third drive train 110. Then, the controller 7 rotates the movable plate 50 little by little from the first position illustrated in FIG. 5 and the like to the second position illustrated in FIG. 6 and the like, and controls the holder 42F to maintain the appropriate posture thereof illustrated in FIGS. 5 and 6. At this time, the discharge unit 60 also moves little by little from the third position illustrated in FIG. 5 and the like to the fourth position illustrated in FIG. 6 and the like in synchronization with the small rotation of the movable plate 50. The second discharge path P2 of the second discharge guide 62 moves upward little by little in the horizontal state.

Next, the controller 7 operates the second drive source M2 and the conveyance drive train 130. Accordingly, the controller 7 drives the supply roller 41, the separation roller 42, the first conveyance roller 43, the second conveyance roller 44, and the discharge roller 47, and supplies the sheet SH supported by the supply tray 91 to the conveyance guide 30 to sequentially convey the supplied sheet SH along the conveyance guide 30. When the conveyed sheet SH passes over the reading surface 8B, the controller 7 reads the image on the conveyed sheet SH by the reading sensor 3S which is stopped at the stationary reading position. Next, the controller 7 discharges the sheet SH whose image is read out from the discharge opening 69 toward the discharge tray 96 by the first discharge guide 61, the second discharge guide 62, the discharge roller 47, and the discharge pinch roller 48 of the discharge unit 60.

Meanwhile, the controller 7 rotates the movable plate 50 little by little toward the second position illustrated in FIG. 6 and the like according to the decrease of the sheets SH supported by the supply tray 91 based on the detection signal of the holder posture detection sensor 42J, and moves the discharge unit 60 little by little toward the fourth position illustrated in FIG. 6 and the like. The second discharge path P2 of the second discharge guide 62 moves upward little by little in the horizontal state. As illustrated in FIG. 6, when the number of sheets SH supported by the supply tray 91 decreases and the sheet SH runs out, the controller 7 stops the second drive source M2 and terminates the image reading operation.

Thereafter, the controller 7 operates the scanning mechanism, which is not illustrated, by controlling the scanning mechanism drive source 3M of the reading unit 3, and returns the reading sensor 3S to the standby position. Further, the controller 7 operates the first drive source M1, the first drive train 120, and the third drive train 110 after confirming with a detection means which is not illustrated that the sheet SH is not supported by the discharge tray 96, returns the movable plate 50 to the first position illustrated in FIG. 5 and the like, and returns the discharge unit 60 to the third position illustrated in FIG. 5 and the like.

<Operational Effect>

In the image reading device 1 according to the first embodiment, as illustrated in FIGS. 7 and 11, and the like, the discharge unit 60 includes the first discharge guide 61 and the second discharge guide 62 that are bendably connected to each other. Further, as illustrated in FIGS. 12 and 13, regardless of the movement of the discharge unit 60, the angle at which the second discharge path P2 of the second discharge guide 62 is inclined with respect to the sheet supporting surface 96A in the discharge tray 96, that is, the second inclination angle α2 is constant, and thus the second discharge path P2 is maintained in the horizontal state.

As a result, in the image reading device 1, the posture change of the sheet SH discharged to the discharge tray 96 can be prevented. For example, when the front end of the sheet SH which is being discharged from the discharge opening 69 hangs down by the own weight, it is possible to prevent an angle of abutting on the sheet SH supported by the sheet supporting surface 96A in the discharge tray from becoming excessive. As a result, it is possible to prevent a drawback that the sheet SH supported by the sheet supporting surface 96A is pushed out by the sheet SH which is being discharged from the discharge opening 69.

Therefore, in the image reading device 1 according to the first embodiment, the plurality of sheets SH discharged to the discharge tray 96 can be stably stacked on the sheet supporting surface 96A.

Further, in the image reading device 1, as illustrated in FIG. 7, the first axis X1, the second axis X2, the third axis X3 and the fourth axis X4 are parallel with each other. As illustrated in FIG. 12, the distance L12 between the first axis X1 and the second axis X2, and the distance L34 between the third axis X3 and the fourth axis X4 are equal to each other. Further, the distance L13 between the first axis X1 and the third axis X3 and the distance L24 between the second axis X2 and the fourth axis X4 are equal to each other. That is, the first discharge guide 61, the second discharge guide 62, the link arms 68A and 68B, the first side frame 9A, and the second side frame 9B form a parallelogram link having the first axis X1, the second axis X2, the third axis X3, and the fourth axis X4 as four apexes. Accordingly, in the image reading device 1, it is possible to easily achieve a configuration in which the discharge unit 60 moves while the second inclination angle α2 is constant such that the second discharge path P2 is maintained in the horizontal state.

Further, in the image reading device 1, as illustrated in FIGS. 7, 9, and 10, it is possible to easily modify the parallelogram link that is formed by the first discharge guide 61, the second discharge guide 62, the link arms 68A and 68B, the first side frame 9A, and the second side frame 9B by a configuration in which the first drive source M1 and the first drive train 120 are operated to rotate the link arms 68A and 68B. Accordingly, in the image reading device 1, it is possible to further easily achieve a configuration in which the discharge unit 60 moves while the second inclination angle α2 is constant such that the second discharge path P2 is maintained in the horizontal state.

Further, in the image reading device 1, the link arms 68A and 68B illustrated in FIGS. 7 and 8, and the like support the rotation shaft 47S of the discharge roller 47 to be rotatable around the fourth axis X4 while keeping the distance L34 between the third axis X3 and the fourth axis X4 illustrated in FIG. 12 constant. Accordingly, when the link arms 68A and 68B rotate upward and the discharge unit 60 moves from the third position illustrated in FIG. 12 to the fourth position illustrated in FIG. 13, the engagement between the second gear 142 and the first gear 141 can be maintained within the appropriate range. Therefore, since the drive force from the second drive source M2 can be appropriately transmitted from the second gear 142 to the first gear 141, regardless of the movement of the discharge unit 60, in such a manner that the second drive source M2 and the second drive train 140 are operated, a discharge operation of the sheet SH by the discharge roller 47 can be surely performed.

Further, in the image reading device 1, since the first rotation body is the first gear 141 and the second rotation body is the second gear 142 engaged with the first gear 141, the drive force from the second drive source M2 can be appropriately transmitted to the discharge roller 47.

Further, in the image reading device 1, as illustrated in FIG. 7, the first drive source M1, the first drive train 120, and the third drive train 110 are provided on the side of the first side frame 9A. On the other hand, the second drive source M2 and the conveyance drive train 130 including the second drive train 140 are provided on the side of the second side frame 9B. Accordingly, the first drive source M1, the first drive train 120, and the third drive train 110 for performing the moving operation of the movable plate 50 and the discharge unit 60; and the second drive source M2 and the conveyance drive train 130 for performing the discharge operation of the sheet SH by the discharge roller 47 are disposed to be dispersed on one side and the other side in an axial direction of the discharge roller 47 with respect to the conveyance guide 30. As a result, both arrangement spaces can be reduced.

Further, in the image reading device 1, an interval between the right end part of the first discharge guide 61 and the left end part of the second discharge guide 62 can be filled by the plurality of protruding portions 61F that are formed at the right end part of the first discharge guide 61 and the plurality of recessed portions 62F that are formed at the left end part of the second discharge guide 62. As a result, the sheet SH guided to the first discharge guide 61 can be prevented from entering into the interval and being jammed in front of the second discharge guide 62.

Further, in the image reading device 1, as illustrated in FIG. 11, since the fourth axis X4 which is the rotation axis of the discharge roller 47 deviates upward further than the upper surface of the second discharge guide 62, the nip position N1 between the discharge roller 47 and the discharge pinch roller 48 can be disposed at a position close to the discharge opening 69 in the up and down direction. As a result, the sheet SH can be appropriately discharged from the discharge opening 69 by the discharge roller 47 and the discharge pinch roller 48.

Second Embodiment

Figure 14:
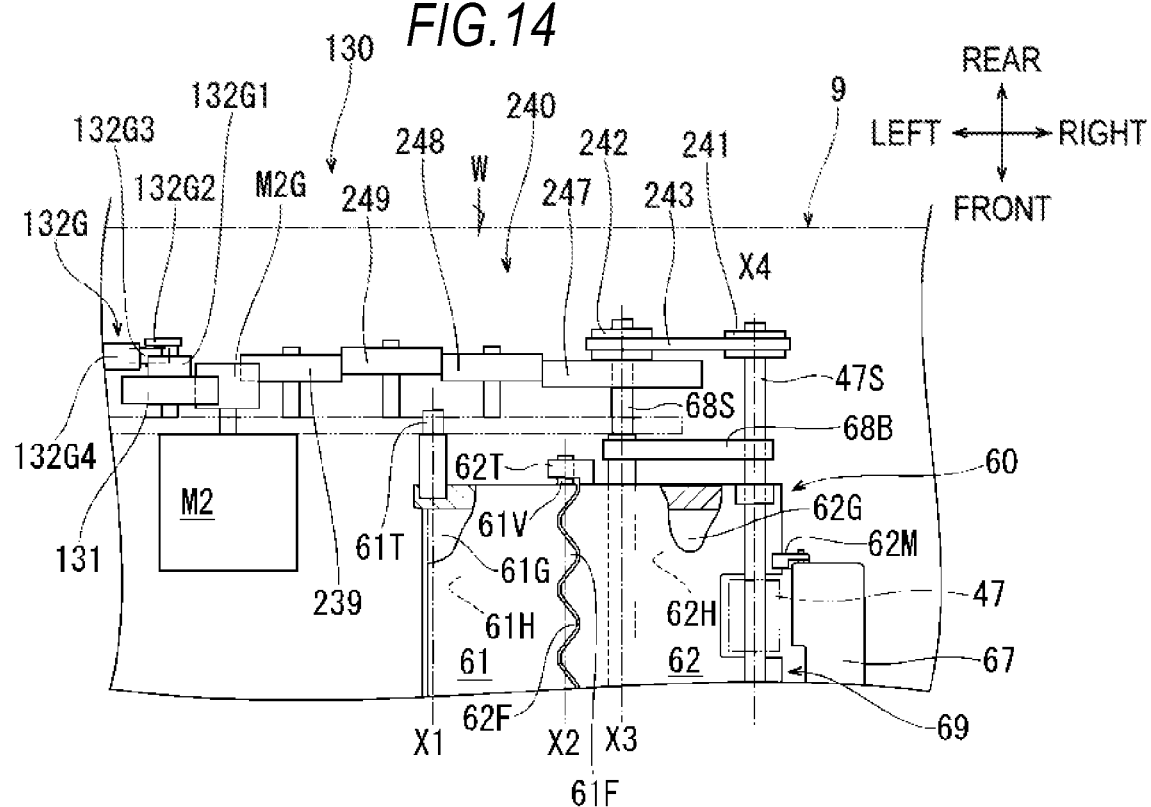
FIG. 14 is a partial schematic top view illustrating an image reading device according to a second embodiment.
Figure 15:
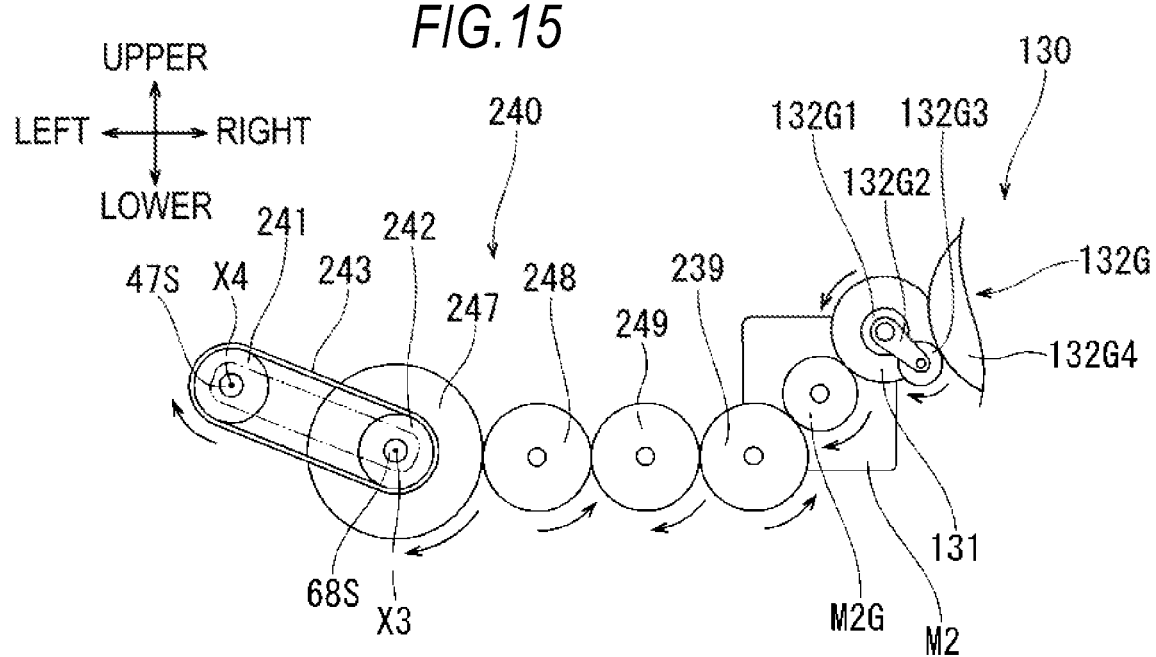
FIG. 15 is a partial schematic diagram illustrating the second drive source, the conveyance drive train, and the like when viewed from an arrow W direction in FIG. 7.

As illustrated in FIGS. 14 and 15, in an image reading device of a second embodiment, a second drive train 240 is adopted instead of the second drive train 140 of the conveyance drive train 130 according to the first embodiment. Other configurations of the second embodiment are the same as those of the first embodiment. Therefore, the same reference signs are denoted to the same configurations as those of the first embodiment, and descriptions thereof will be omitted or simplified.

The second drive train 240 includes a gear 239, a gear 249, a gear 248, a gear 247, a second pulley 242, a first pulley 241, and a timing belt 243. The first pulley 241 is an example of "a first rotation body" of this disclosure. The second pulley 242 is an example of "a second rotation body" of this disclosure.

The gear 247 is engaged with the drive gear M2G via the gears 239, 249 and 248. The gear 247 and the second pulley 242 are formed as one member. The gear 247 and the second pulley 242 are inserted into a rear end part of the link arm rotation shaft 68S to be rotatable independently. Accordingly, when the rotation of the drive gear M2G is transmitted to the gear 247 via the gears 239, 249 and 248, the gear 247 and the second pulley 242 are rotatable around the third axis X3 independently from the link arms 68A and 68B.

The first gear 241 is fixed to the rear end part of the rotation shaft 47S of the discharge roller 47 and is rotatable around the fourth axis X4 together with the rotation shaft 47S of the discharge roller 47. The timing belt 243 is wound around the second pulley 242 and the first pulley 241.

The gears 239, 249, 248, and 247, the second pulley 242, the timing belt 243, and the first pulley 241 transmit the drive force from the second drive source M2 to the rotation shaft 47S of the discharge roller 47 to rotate the discharge roller 47 in a direction in which the sheet SH is discharged to the discharge tray 96, that is, clockwise in FIG. 15.

Since the link arms 68A and 68B support the rotation shaft 47S of the discharge roller 47 to be rotatable around the fourth axis X4 while keeping the distance between the third axis X3 and the fourth axis X4 constant, when the link arms 68A and 68B rotate, tension of the timing belt 243 can be maintained within an appropriate range, and thus the drive force can be appropriately transmitted from the second pulley 242 to the first pulley 241.

In the same manner as that of the image reading device 1 according to the first embodiment, in the image reading device including the above-mentioned configurations according to the second embodiment, the plurality of sheets SH discharged to the discharge tray 96 can be stably stacked on the sheet supporting surface 96A.

Third Embodiment

Figure 16:
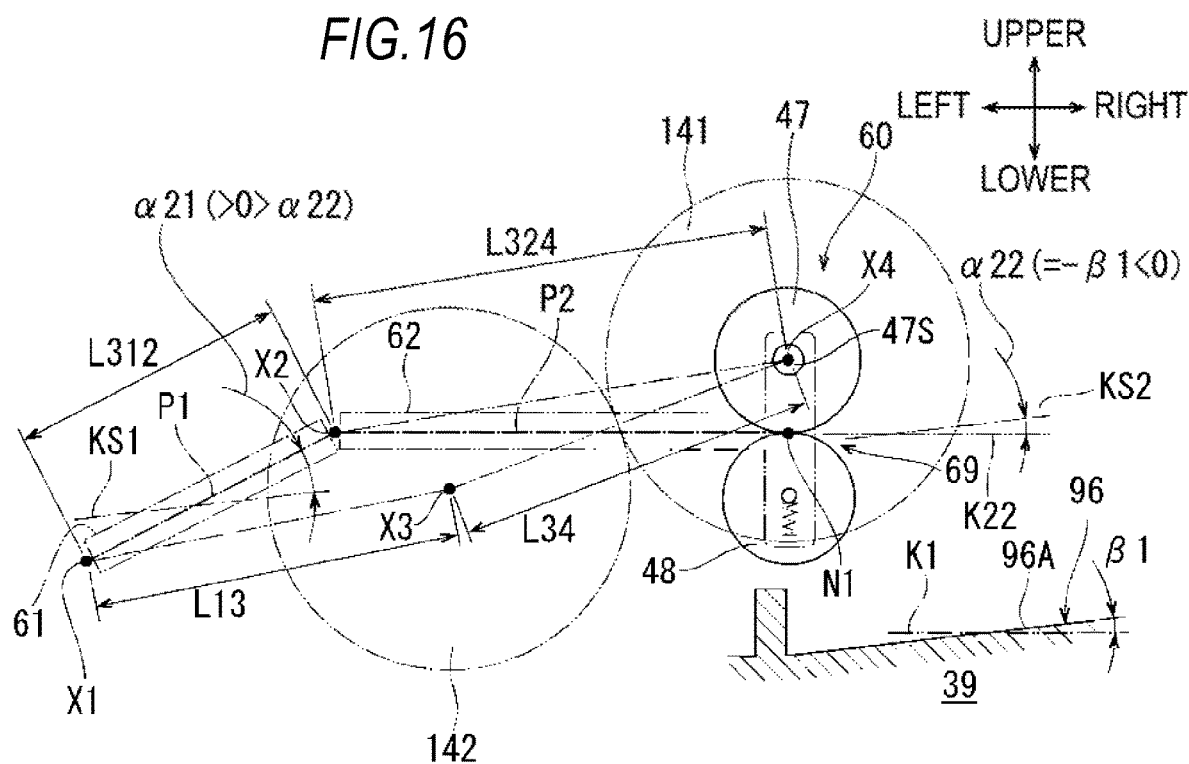
FIG. 16 is a schematic diagram explaining a relative relationship among a first discharge guide, a second discharge guide, a discharge roller, a discharge pinch roller, and a discharge tray in a state in which a discharge unit is at a third position in an image reading device according to a third embodiment.

As illustrated in FIG. 16, in an image reading device according to a third embodiment, a distance L312 between the first axis X1 and the second axis X2 is set to be shorter than the distance L12 between the first axis X1 and the second axis X2 according to the image reading device 1 of the first embodiment. On the other hand, a distance L324 between the second axis X2 and the fourth axis X4 is set to be longer than the distance L24 between the second axis X2 and the fourth axis X4 according to the image reading device 1 of the first embodiment. Further, the distance L312 and the distance L324 are set so that the second discharge path P2 is in the horizontal state while the discharge unit 60 is at the third position illustrated in FIG. 16. On the other hand, the distance L13 between the first axis X1 and the third axis X3, and the distance L34 between the third axis X3 and the fourth axis X4 are the same as those of the first embodiment. Other configurations of the third embodiment are the same as those of the first embodiment. Therefore, the same reference signs are denoted to the same configurations as those of the first embodiment, and descriptions thereof will be omitted or simplified.

Figure 17:
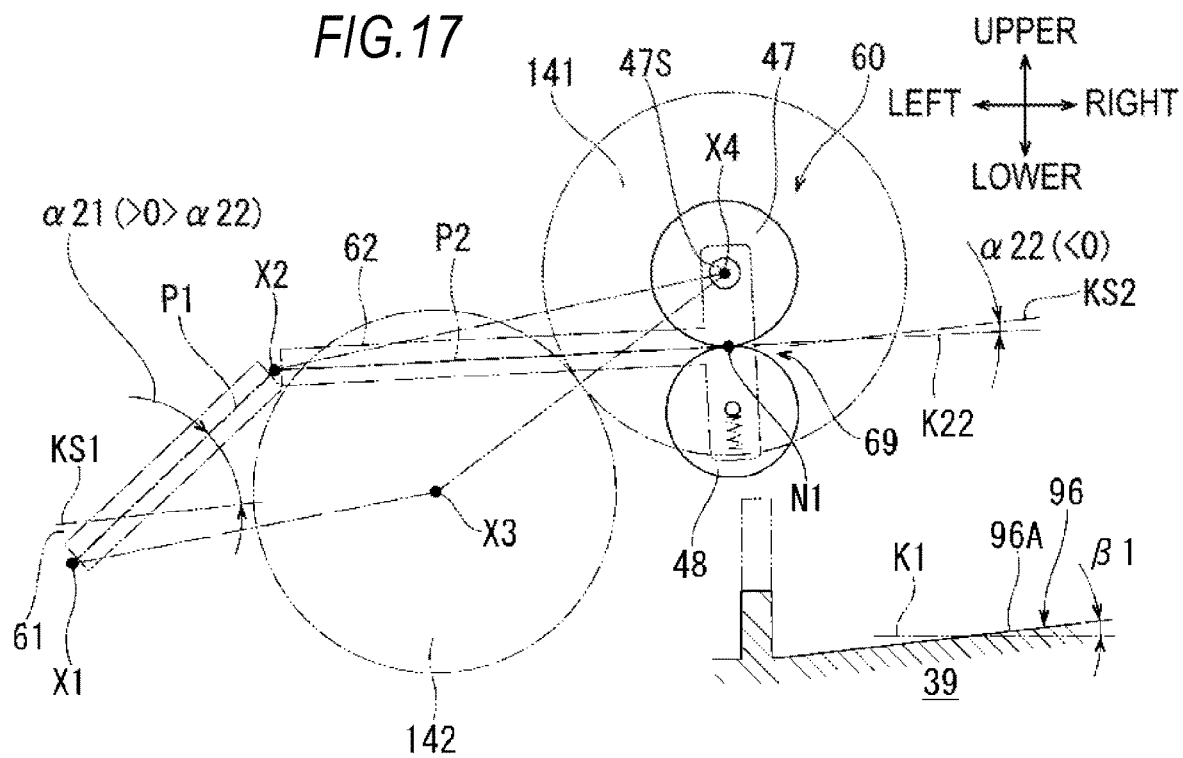
FIG. 17 is a schematic diagram explaining a relative relationship among the first discharge guide, the second discharge guide, the discharge roller, the discharge pinch roller, and the discharge tray in a state in which the discharge unit is at a fourth position.

As illustrated in FIGS. 16 and 17, in the image reading device of the third embodiment, the first discharge guide 61, the second discharge guide 62, the link arms 68A and 68B, the first side frame 9A, and the second side frame 9B form a four-joint link having the first axis X1, the second axis X2, the third axis X3, and the fourth axis X4 as four apexes.

A virtual line K22 is an extension line of the second discharge path P2. Since the second discharge path P2 is horizontal in the state in which the discharge unit 60 is at the third position illustrated in FIG. 16, the virtual line K22 is also a straight line extending horizontally in the left and right direction. When the discharge unit 60 moves to the fourth position illustrated in FIG. 17, the second discharge path P2 becomes a state of being gently inclined upward to the right by the above-mentioned setting of the distance L312 and the distance L324. The virtual line K22 also becomes a straight line inclined upward to the right.

An angle at which the first discharge path P1 of the first discharge guide 61 is inclined with respect to the sheet supporting surface 96A in the discharge tray 96 is a first inclination angle α21.

An angle at which the second discharge path P2 of the second discharge guide 62 is inclined with respect to the sheet supporting surface 96A in the discharge tray 96 is a second inclination angle α22.

The first inclination angle α21, the second inclination angle α22, and the inclination angle β1 have a relationship as follows:

$$\alpha 21 > 0 > \alpha 22 \geq -\beta 1$$

When the link arms 68A and 68B rotate upward and the discharge unit 60 moves from the third position illustrated in FIG. 16 to the fourth position illustrated in FIG. 17, the first inclination angle α21 increases, the second inclination angle α22 increases more gently than the first inclination angle α21, and the second discharge path P2 changes from the horizontal state to a state of being gently inclined upward to the right. In other words, the discharge unit 60 is configured to move while maintaining the state in which the second inclination angle α22 is smaller than the first inclination angle α21.

In the same manner as that of the image reading device 1 according to the first and second embodiments, the image reading device including the above-mentioned configurations according to the third embodiment can stably stack the plurality of sheets SH discharged to the discharge tray 96 on the sheet supporting surface 96A.

Further, in the image reading device, it is possible to significantly secure a moving stroke in the up and down direction of the discharge opening 69 while preventing the posture change of the sheet SH discharged to the discharge tray 96 by a configuration in which the second inclination angle α22 increases more gently than the first inclination angle α21.

As described above, this disclosure is described according to the first to third embodiments, but this disclosure is not limited to the first to third embodiments, and it goes without saying that this disclosure can be applied by being appropriately modified within the scope not deviated from the gist thereof.

In the first to third embodiments, the movable plate 50 is configured to rotate but is not limited to this configuration, and for example, the movable plate 50 may be linearly moved.

In the first to third embodiments, the first drive train 120 transmits the drive force from the first drive source M1 to the link arms 68A and 68B, thereby rotating the link arms 68A and 68B, however, this disclosure is not limited to this configuration. The first drive train may rotate the first discharge guide by transmitting the drive force from the first drive source to the first discharge guide.

For example, this disclosure can be used for an image reading device, a multifunction machine, or the like.

What is claimed is:

1. An image reading device comprising:
    a supply tray, which supports sheets to be supplied and includes a movable plate configured to move from a first position to a second position as the sheets supported by the supply tray is decreased, the second position being higher than the first position;
    a discharge tray, which is positioned below the supply tray and supports the sheet to be discharged;
    a conveyance guide, which conveys the sheet from the supply tray to the discharge tray;
    a reading sensor, which reads an image on the sheet to be conveyed on the conveyance guide; and
    a discharge unit, which includes a discharge opening to discharge the sheet conveyed by the conveyance guide to the discharge tray and is configured to move from a third position to a fourth position as the document supported by the paper feed tray is decreased, the fourth position being higher than the third position; wherein
    the discharge unit includes:
        a first discharge guide, which guides the sheet conveyed by the conveyance guide;
        a second discharge guide, which includes the discharge opening and guides the sheet guided by the first discharge guide toward the discharge tray;
        a discharge roller, which is provided in the second discharge guide and discharges the sheet from the discharge opening; and
        a discharge pinch roller, which is provided in the second discharge guide and is pressed against the discharge roller,
    the first discharge guide is rotatable around a first axis which is parallel with an axial direction of the discharge roller,
    the second discharge guide is connected to the first discharge guide to be rotatable around a second axis which is parallel with the first axis; and
    an angle, at which the second discharge guide is inclined with respect to a sheet supporting surface in the discharge tray, is constant while the discharge unit is moving from the third position up to the fourth position.

2. The image reading device according to claim 1, further comprising:
    a frame member, which supports the first discharge guide to be rotatable around the first axis; and
    a link arm, which is supported by the frame member to be rotatable around a third axis and is connected to the second discharge guide to be rotatable around a fourth axis, wherein
    the first axis, the second axis, the third axis, and the fourth axis are parallel to each other;
    a distance between the first axis and the second axis is equal to a distance between the third axis and the fourth axis; and
    a distance between the first axis and the third axis is equal to a distance between the second axis and the fourth axis.

3. The image reading device according to claim 2, further comprising:
    a first drive source, which generates a drive force; and
    a first drive train, which transmits the drive force from the first drive source to the first discharge guide and one side of the link arm to rotate the first discharge guide and one side of the link arm.

4. The image reading device according to claim 3, further comprising:
    a second drive source which generates a drive force; and
    a second drive train which transmits the drive force from the second drive source to the discharge roller, wherein
    the discharge roller is rotatable around the fourth axis; and
    the second drive train includes:
        a first rotation body, which is rotatable around the fourth axis together with a rotation shaft of the discharge roller; and a second rotation body, which is rotatable around the third axis and transmits the drive force from the second drive source to the first rotation body.

5. The image reading device according to claim 4, wherein
the first rotation body is a first gear; and
the second rotation body is a second gear which is engaged with the first gear.

6. The image reading device according to claim 4, further comprising:
a first side frame; and
a second side frame, wherein
the conveyance guide is provided between the first side frame and the second side frame in the axial direction of the discharge roller;
the first drive source and the first drive train are provided on the first side frame side; and
the second drive source and the second drive train are provided on the second side frame side.

7. The image reading device according to claim 1, wherein
a plurality of protruding portions are formed at a first end part, which is opposite to the second discharge guide, of the first discharge guide; and
a plurality of recessed portions into which the respective protruding portions enter are formed at a second end part, which is opposite to the first end part of the first discharge guide, of the second discharge guide.

8. The image reading device according to claim 1, wherein
a rotation axis of the discharge roller deviates upward further than the second discharge guide.

9. An image reading device, comprising:
a supply tray, which supports sheets to be supplied and includes a movable plate configured to move from a first position to a second position as the sheets supported by the supply tray is decreased, the second position being higher than the first position;
a discharge tray, which is positioned below the supply tray and supports the sheet to be discharged;
a conveyance guide, which conveys the sheet from the supply tray to the discharge tray;
a reading sensor, which reads an image on the sheet to be conveyed on the conveyance guide; and
a discharge unit, which includes a discharge opening to discharge the sheet conveyed by the conveyance guide to the discharge tray and is configured to move from a third position to a fourth position as the document supported by the paper feed tray is decreased, the fourth position being higher than the third position; wherein
the discharge unit includes:
a first discharge guide, which guides the sheet conveyed by the conveyance guide;
a second discharge guide, which includes the discharge opening and guides the sheet guided by the first discharge guide toward the discharge tray;
a discharge roller, which is provided in the second discharge guide and discharges the sheet from the discharge opening; and
a discharge pinch roller, which is provided in the second discharge guide and is pressed against the discharge roller to contact the discharge roller at a nip position,
the first discharge guide is rotatable around a first axis, which is parallel with an axial direction of the discharge roller;
the second discharge guide is connected to the first discharge guide to be rotatable around a second axis which is parallel with the first axis; and
when an angle, at which a first discharge path extending from the first axis up to the second axis, is inclined with respect to a sheet supporting surface in the discharge tray is defined as a first inclination angle, and an angle, at which a second discharge path extending from the second axis up to the nip position, is inclined with respect to the sheet supporting surface is defined as a second inclination angle,
the discharge unit is configured to move while maintaining a state in which the second inclination angle is smaller than the first inclination angle.

* * * * *